United States Patent
Su et al.

(10) Patent No.: US 11,997,671 B2
(45) Date of Patent: May 28, 2024

(54) COMMUNICATION METHOD, APPARATUS, AND SYSTEM

(71) Applicant: Huawei Technologies Co., Ltd., Guangdong (CN)

(72) Inventors: Yuwan Su, Shenzhen (CN); Jun Li, Shanghai (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 451 days.

(21) Appl. No.: 17/390,646

(22) Filed: Jul. 30, 2021

(65) Prior Publication Data

US 2021/0360662 A1    Nov. 18, 2021

Related U.S. Application Data

(63) Continuation of application No. PCT/CN2019/074721, filed on Feb. 3, 2019.

(51) Int. Cl.
*H04W 72/1268* (2023.01)
*H04L 5/00* (2006.01)

(52) U.S. Cl.
CPC ....... *H04W 72/1268* (2013.01); *H04L 5/0005* (2013.01); *H04L 5/0048* (2013.01)

(58) Field of Classification Search
CPC . H04W 72/1268; H04L 5/0005; H04L 5/0048
See application file for complete search history.

(56) References Cited

U.S. PATENT DOCUMENTS

| | | | |
|---|---|---|---|
| 11,147,047 B2* | 10/2021 | Wu | H04L 5/0007 |
| 2016/0150541 A1 | 5/2016 | Park et al. | |
| 2020/0107389 A1* | 4/2020 | Charbit | H04W 76/27 |

(Continued)

FOREIGN PATENT DOCUMENTS

| | | | |
|---|---|---|---|
| CN | 108023705 A | 5/2018 | |
| CN | 108024310 A | 5/2018 | |

(Continued)

OTHER PUBLICATIONS

Ericsson: "Support for transmission in preconfigured UL resources in NB-IoT", 3GPP Draft; R1-1812128, Nov. 12, 2018 16, XP051553969.

(Continued)

*Primary Examiner* — Michael J Moore, Jr.
(74) *Attorney, Agent, or Firm* — WOMBLE BOND DICKINSON (US) LLP

(57) ABSTRACT

A communication method, an apparatus, and a system for determining, by a first terminal device, a reference time domain position based on a preconfigured uplink time-frequency resource, where the reference time domain position is the same as a reference time domain position determined by another terminal device in a plurality of terminal devices, and the reference time domain position is used to initialize a first sequence; generating, by the first terminal device, a first reference signal based on the first sequence and a time interval, where the time interval is an interval between the reference time domain position and a start time domain position of transmission of the first reference signal; and sending, by the first terminal device, the first reference signal to a network device.

20 Claims, 14 Drawing Sheets

(56) References Cited

U.S. PATENT DOCUMENTS

| | | | | |
|---|---|---|---|---|
| 2021/0352691 A1* | 11/2021 | Li | .......................... | H04W 72/21 |
| 2021/0360637 A1* | 11/2021 | Su | ...................... | H04W 72/0446 |
| 2021/0360662 A1* | 11/2021 | Su | ......................... | H04L 5/0051 |
| 2021/0385834 A1* | 12/2021 | Morozov | ........... | H04W 52/0216 |
| 2021/0385835 A1* | 12/2021 | Medina Acosta | ..... | H04W 72/23 |
| 2021/0392659 A1* | 12/2021 | Tirronen | ............. | H04W 72/535 |
| 2022/0007391 A1* | 1/2022 | Höglund | ............... | H04W 72/21 |
| 2022/0038997 A1* | 2/2022 | Höglund | ............... | H04W 48/06 |
| 2022/0104225 A1* | 3/2022 | Yan | .................... | H04W 72/1268 |
| 2022/0123885 A1* | 4/2022 | Shin | .................. | H04W 74/0833 |

FOREIGN PATENT DOCUMENTS

| | | | | |
|---|---|---|---|---|
| CN | 109152026 A | 1/2019 | | |
| CN | 109302739 A | 2/2019 | | |
| WO | 2017157270 A1 | 9/2017 | | |
| WO | 2017173660 A1 | 10/2017 | | |
| WO | WO-2020089457 A1 * | 5/2020 | ........... | H04L 5/0044 |

OTHER PUBLICATIONS

"3rd Generation Partnership Pro ect; Technical Specification Group Radio Access Network; Evolved Universal Terrestrial Radio Access (E-UTRA); Physical channels and modulation (Release 15)",3GPP TS 36.211, V15.4.0, Jan. 11, 2019 (Jan. 11, 2019), pp. 191-240, XP051591652.

LG Electronics: "Discussion and comments on NB-IoT CRs", 3GPP Draft; R1-164494,May 23, 2016 27,XP051096427, total 2 pages.

* cited by examiner

COMMUNICATION METHOD, APPARATUS, AND SYSTEM

CROSS-REFERENCE TO RELATED APPLICATIONS

This application is a continuation of International Application No. PCT/CN2019/074721, filed on Feb. 3, 2019, the disclosure of which is hereby incorporated by reference in its entirety.

TECHNICAL FIELD

This application relates to the communication field, and in particular, to a transmission of uplink data based on a position of an uplink time-frequency resource.

BACKGROUND

In a fifth generation (5G) communication technology, a narrowband internet of things (NB-IoT) system is used to support communication with relatively large coverage.

Uplink scheduling-free transmission is being studied in NB-IoT release 16. To be specific, when transmitting uplink data, a terminal device does not need to apply to a network device for an uplink transmission resource, and does not need to wait for the network device to deliver scheduling information for uplink transmission. In this way, an interaction procedure can be reduced, a power consumption delay can be reduced, and signaling overheads can be reduced. Particularly, during the uplink scheduling-free transmission, the network device may configure different preconfigured uplink time-frequency resources (PUR), namely, dedicated resources, for different terminal devices, or may configure a same preconfigured uplink time-frequency resource or partially overlapping preconfigured uplink time-frequency resources, namely, a shared resource, for the different terminal devices. Compared with the dedicated resources, the shared resource helps reduce network resource overheads and improve a spectrum utilization rate.

In addition, when transmitting the uplink data, the terminal device simultaneously sends a demodulation reference signal (DMRS). The DMRS is used by the network device to perform channel estimation and channel equalization, to correctly demodulate the uplink data. When the different terminal devices transmit uplink data on the shared resource, orthogonal DMRS sequences need to be used, and the network device distinguishes between the different terminal devices based on the orthogonal DMRS sequences.

To enable a plurality of terminal devices to use orthogonal DMRS sequences when transmitting uplink data, all the plurality of terminal devices are required to start transmitting the uplink data at a start position of a preconfigured uplink time-frequency resource. Once the terminal devices do not need to transmit the uplink data at the start position of the preconfigured uplink time-frequency resource, but needs to transmit the uplink data after the start position of the preconfigured uplink time-frequency resource, the terminal devices need to wait until a start position of a next preconfigured uplink time-frequency resource to start transmitting the uplink data.

SUMMARY

Embodiments of this application provide a communication method, an apparatus, and a system, so that a terminal device can transmit uplink data before a start position of a next preconfigured uplink time-frequency resource when the terminal device needs to transmit the uplink data after a start position of a preconfigured uplink time-frequency resource.

To achieve the foregoing objective, the following technical solutions are used in the embodiments of this application.

According to a first aspect, a communication method is provided. The method is applicable to a wireless communication system. The wireless communication system includes a first cell. The first cell includes a plurality of terminal devices that can transmit uplink data on a same uplink time-frequency resource. The plurality of terminal devices include a first terminal device. The method includes: determining (e.g., identifying, measuring, calculating), by the first terminal device, a reference time domain position based on a preconfigured uplink time-frequency resource, where the reference time domain position is the same as a reference time domain position determined by another terminal device in the plurality of terminal devices, and the reference time domain position is used to initialize a first sequence; generating, by the first terminal device, a first reference signal based on the first sequence and a time interval, where the time interval is an interval between the reference time domain position and a start time domain position of transmission of the first reference signal; and sending (e.g., transmitting, providing, delivering), by the first terminal device, the first reference signal to a network device.

According to the communication method provided in this embodiment of this application, the first terminal device and the network device determine the reference time domain position based on the preconfigured uplink time-frequency resource. The reference time domain position is the same as the reference time domain position determined by the another terminal device in the plurality of terminal devices. The reference time domain position is used to initialize the first sequence. The first terminal device and the network device generate the first reference signal based on the first sequence and the time interval. The time interval is the interval between the reference time domain position and the start time domain position of the transmission of the first reference signal. The first terminal device sends the first reference signal to the network device. The network device receives (e.g., retrieves, obtains, acquires) a second reference signal from the first terminal device. The network device demodulates uplink data from the first terminal device based on the first reference signal and the second reference signal. Because the first sequence is initialized at the reference time domain position, different terminal devices correspond to a same first sequence on a same time-frequency resource. The first reference signal is generated based on the first sequence and the foregoing time interval. The foregoing time interval enables the different terminal devices to correspond, starting from the start time domain position of the transmission of the first reference signal, to the same first sequence on the same time-frequency resource. After first reference signals are obtained by performing (e.g., executing, implementing) a linear operation on the first sequence and orthogonal Hadamard sequences, it is ensured that, the first reference signals corresponding to the different terminal devices are always orthogonal on the same time-frequency resource. Therefore, even if uplink data needs to be transmitted after a start position of the preconfigured uplink time-frequency resource, the uplink data can still be sent on the preconfigured uplink time-frequency resource, so that the terminal device can transmit the uplink data before a start position of a next preconfigured uplink time-frequency resource when the terminal device needs to transmit the uplink data after the start position of the preconfigured uplink time-frequency resource.

In some embodiments, the reference time domain position is a time domain position before a start time domain position of the preconfigured uplink time-frequency resource in a periodicity of the preconfigured uplink time-frequency resource.

In some embodiments, the reference time domain position is a start position of the periodicity of the preconfigured uplink time-frequency resource.

In some embodiments, the start position of the periodicity of the preconfigured uplink time-frequency resource satisfies: (Subframe number corresponding to the start position) mod (Periodicity of the preconfigured uplink time-frequency resource/First specified value)=0; or (Frame number corresponding to the start position) mod (Periodicity of the preconfigured uplink time-frequency resource/Second specified value)=0, where mod( ) represents modulo, and the first specified value or the second specified value is a positive number.

In some embodiments, the reference time domain position is a start time domain position of the preconfigured uplink time-frequency resource.

In some embodiments, the determining, by the first terminal device, a reference time domain position based on a preconfigured uplink time-frequency resource includes: receiving, by the first terminal device, first indication information from the network device, where the first indication information is used to indicate first offset duration of the reference time domain position relative to the start position of the periodicity of the preconfigured uplink time-frequency resource; and determining, by the first terminal device, the reference time domain position based on the first indication information and the start position of the periodicity of the preconfigured uplink time-frequency resource. Based on this solution, the first terminal device may determine the reference time domain position.

In some embodiments, the determining, by the first terminal device, a reference time domain position based on a preconfigured uplink time-frequency resource includes: receiving, by the first terminal device, second indication information from the network device, where the second indication information is used to indicate second offset duration of the start time domain position of the preconfigured uplink time-frequency resource relative to the reference time domain position; and determining, by the first terminal device, the reference time domain position based on the second indication information and the start time domain position of the preconfigured uplink time-frequency resource. Based on this solution, the first terminal device may determine the reference time domain position.

In some embodiments, the generating, by the first terminal device, a first reference signal based on the first sequence and a time interval includes: generating, by the first terminal device based on the first sequence and the time interval, the first reference signal whose length is transmission duration of the first reference signal.

In some embodiments, the first sequence is a Gold sequence, and the first sequence, the time interval, the transmission duration of the first reference signal, and the first reference signal satisfy the following formula:

$$r_u(n - \text{offset}) = \frac{1}{\sqrt{2}}(1 + j)(1 - 2c(n))w(n \bmod 16),$$

$$\text{offset} \leq n < M_{rep}^{NPUSCH} N_{slots}^{UL} N_{RU} + \text{offset},$$

where $r_u(n)$ is the first reference signal, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, $c(n)$ is a Gold sequence, and $w(n)$ is a Hadamard sequence.

In some embodiments, the generating, by the first terminal device, a first reference signal based on the first sequence and a time interval includes: generating, by the first terminal device, based on the first sequence, a second sequence whose duration is a sum of the time interval and transmission duration of the first reference signal; and determining, by the first terminal device, that a sequence whose length is the transmission duration of the first reference signal and that is in the second sequence is the first reference signal, where a distance between the first value of the first reference signal and the first value of the second sequence is the time interval.

In some embodiments, the first sequence is a Gold sequence, and the first sequence, the time interval, the transmission duration of the first reference signal, and the second sequence satisfy the following formula:

$$X(n) = \frac{1}{\sqrt{2}}(1 + j)(1 - 2c(n))w(n \bmod 16),$$

$$0 \leq n < M_{rep}^{NPUSCH} N_{slots}^{UL} N_{RU} + \text{offset},$$

$X(n)$ is the second sequence, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, $c(n)$ is a Gold sequence, and $w(n)$ is a Hadamard sequence.

In some embodiments, the first reference signal is $r_u(n)$, where $r_u(n-\text{offset})=X(n)$, and a value range of n satisfies: offset≤n<$M_{rep}^{NPUSCH} N_{slots}^{UL} N_{RU}$+offset.

In some embodiments, the first sequence is a Gold sequence, and the first sequence, the time interval, the transmission duration of the first reference signal, and the first reference signal satisfy the following formula:

$$r_u(n) = \frac{1}{\sqrt{2}}(1 + j)(1 - 2c(n + \text{offset}))w(n \bmod 16),$$

$$0 \leq n < M_{rep}^{NPUSCH} N_{slots}^{UL} N_{RU},$$

where $r_u(n)$ is the first reference signal, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, c(n) is a Gold sequence, and w(n) is a Hadamard sequence.

In some embodiments, a length of the first sequence is a sum of the time interval and transmission duration of the first reference signal. The generating, by the first terminal device, a first reference signal based on the first sequence and a time interval includes: determining, by the first terminal device, that a sequence whose length is the transmission duration of the first reference signal and that is in the first sequence is a third sequence, where a distance between the first value of the third sequence and the first value of the first sequence is the time interval; and generating, by the first terminal device, the first reference signal based on the third sequence.

In some embodiments, the first sequence is a Gold sequence c(n) where a value range of n satisfies $0 \leq n < M_{rep}^{NPUSCH} N_{slots}^{UL} N_{RU}$+offset, offset is the time interval, $M_{rep}^{NPUSCH} N_{slots}^{UL} N_{RU}$ is the transmission duration of the first reference signal, $N_{slots}^{UL}$ is a quantity of repetitions of transmission of a narrowband physical uplink shared channel, $N_{slots}^{UL}$ is a quantity of slots occupied by one resource unit, and $N_{RU}$ is a quantity of resource units occupied by one data block.

In some embodiments, the time interval, the transmission duration of the first reference signal, the third sequence, and the first reference signal satisfy the following formula:

$$r_u(n) = \frac{1}{\sqrt{2}}(1+j)(1-2c(n+\text{offset}))w(n \bmod 16),$$

$$0 \leq n < M_{rep}^{NPUSCH} N_{slots}^{UL} N_{RU},$$

where $r_u(n)$ is the first reference signal, c(n+offset) is the third sequence, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, and $N_{RU}$ is a quantity of resource units occupied by one data block.

According to a second aspect, a communication method is provided. The method is applicable to a wireless communication system. The wireless communication system includes a first cell. The first cell includes a plurality of terminal devices that can transmit uplink data on a same uplink time-frequency resource. The plurality of terminal devices include a first terminal device. The method includes: determining, by a network device, a reference time domain position based on a preconfigured uplink time-frequency resource, where the reference time domain position is the same as a reference time domain position determined by another terminal device in the plurality of terminal devices, and the reference time domain position is used to initialize a first sequence; generating, by the network device, a first reference signal based on the first sequence and a time interval, where the time interval is an interval between the reference time domain position and a start time domain position of transmission of the first reference signal; receiving, by the network device, a second reference signal from the first terminal device; and demodulating, by the network device, uplink data from the first terminal device based on the first reference signal and the second reference signal.

According to the communication method provided in this embodiment of this application, the first terminal device and the network device determine the reference time domain position based on the preconfigured uplink time-frequency resource. The reference time domain position is the same as the reference time domain position determined by the another terminal device in the plurality of terminal devices. The reference time domain position is used to initialize the first sequence. The first terminal device and the network device generate the first reference signal based on the first sequence and the time interval. The time interval is the interval between the reference time domain position and the start time domain position of the transmission of the first reference signal. The first terminal device sends the first reference signal to the network device. The network device receives the second reference signal from the first terminal device. The network device demodulates the uplink data from the first terminal device based on the first reference signal and the second reference signal. Because the first sequence is initialized at the reference time domain position, different terminal devices correspond to a same first sequence on a same time-frequency resource. The first reference signal is generated based on the first sequence and the foregoing time interval. The foregoing time interval enables the different terminal devices to correspond, starting from the start time domain position of the transmission of the first reference signal, to the same first sequence on the same time-frequency resource. After first reference signals are obtained by performing a linear operation on the first sequence and orthogonal Hadamard sequences, it is ensured that, the first reference signals corresponding to the different terminal devices are always orthogonal on the same time-frequency resource. Therefore, even if uplink data needs to be transmitted after a start position of the preconfigured uplink time-frequency resource, the uplink data can still be sent on the preconfigured uplink time-frequency resource, so that the terminal device can transmit the uplink data before a start position of a next preconfigured uplink time-frequency resource when the terminal device needs to transmit the uplink data after the start position of the preconfigured uplink time-frequency resource.

In some embodiments, the reference time domain position is a time domain position before a start time domain position of the preconfigured uplink time-frequency resource in a periodicity of the preconfigured uplink time-frequency resource.

In some embodiments, the reference time domain position is a start position of the periodicity of the preconfigured uplink time-frequency resource.

In some embodiments, the start position of the periodicity of the preconfigured uplink time-frequency resource satisfies: (Subframe number corresponding to the start position) mod (Periodicity of the preconfigured uplink time-frequency resource/First specified value)=0; or (Frame number corresponding to the start position) mod (Periodicity of the preconfigured uplink time-frequency resource/Second specified value)=0, where mod( ) represents modulo, and the first specified value or the second specified value is a positive number.

In some embodiments, the reference time domain position is a start time domain position of the preconfigured uplink time-frequency resource.

In some embodiments, the determining, by a network device, a reference time domain position based on a preconfigured uplink time-frequency resource includes: determining, by the network device, first indication information, where the first indication information is used to indicate first offset duration of the reference time domain position relative to the start position of the periodicity of the preconfigured uplink time-frequency resource; and determining, by the network device, the reference time domain position based on the first indication information and the start position of the periodicity of the preconfigured uplink time-frequency resource. Based on this solution, the first terminal device may determine the reference time domain position.

In some embodiments, the determining, by a network device, a reference time domain position based on a preconfigured uplink time-frequency resource includes: determining, by the network device, second indication information, where the second indication information is used to indicate second offset duration of the start time domain position of the preconfigured uplink time-frequency resource relative to the reference time domain position; and determining, by the network device, the reference time domain position based on the second indication information and the start time domain position of the preconfigured uplink time-frequency resource. Based on this solution, the first terminal device may determine the reference time domain position.

In some embodiments, the generating, by the network device, a first reference signal based on the first sequence and a time interval includes: generating, by the network device based on the first sequence and the time interval, the first reference signal whose length is transmission duration of the first reference signal.

In some embodiments, the first sequence is a Gold sequence, and the first sequence, the time interval, the transmission duration of the first reference signal, and the first reference signal satisfy the following formula:

$$r_u(n - \text{offset}) = \frac{1}{\sqrt{2}}(1 + j)(1 - 2c(n))w(n \bmod 16),$$

$$\text{offset} \le n < M_{rep}^{NPUSCH} N_{slots}^{UL} N_{RU} + \text{offset},$$

where $r_u(n)$ is the first reference signal, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, $c(n)$ is a Gold sequence, and $w(n)$ is a Hadamard sequence.

In some embodiments, the generating, by the network device, a first reference signal based on the first sequence and a time interval includes: generating, by the network device, based on the first sequence, a second sequence whose duration is a sum of the time interval and transmission duration of the first reference signal; and determining, by the network device, that a sequence whose length is the transmission duration of the first reference signal and that is in the second sequence is the first reference signal, where a distance between the first value of the first reference signal and the first value of the second sequence is the time interval.

In some embodiments, the first sequence is a Gold sequence, and the first sequence, the time interval, the transmission duration of the first reference signal, and the second sequence satisfy the following formula:

$$X(n) = \frac{1}{\sqrt{2}}(1 + j)(1 - 2c(n))w(n \bmod 16),$$

$$0 \le n < M_{rep}^{NPUSCH} N_{slots}^{UL} N_{RU} + \text{offset},$$

where
$X(n)$ is the second sequence, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, $c(n)$ is a Gold sequence, and $w(n)$ is a Hadamard sequence.

In some embodiments, the first reference signal is $\overline{r}_u(n)$, where $r_u(n-\text{offset})=X(n)$, and a value range of n satisfies: $\text{offset} \le n < M_{rep}^{NPUSCH} N_{slots}^{UL} N_{RU} + \text{offset}$.

In some embodiments, the first sequence is a Gold sequence, and the first sequence, the time interval, the transmission duration of the first reference signal, and the first reference signal satisfy the following formula:

$$r_u(n) = \frac{1}{\sqrt{2}}(1 + j)(1 - 2c(n + \text{offset}))w(n \bmod 16),$$

$$0 \le n < M_{rep}^{NPUSCH} N_{slots}^{UL} N_{RU},$$

where $r_u(n)$ is the first reference signal, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, $c(n)$ is a Gold sequence, and $w(n)$ is a Hadamard sequence.

In some embodiments, a length of the first sequence is a sum of the time interval and transmission duration of the first reference signal. The generating, by the network device, a first reference signal based on the first sequence and a time interval includes: determining, by the network device, that a sequence whose length is the transmission duration of the first reference signal and that is in the first sequence is a third sequence, where a distance between the first value of the third sequence and the first value of the first sequence is the time interval; and generating, by the network device, the first reference signal based on the third sequence.

In some embodiments, the first sequence is a Gold sequence $c(n)$, where a value range of n satisfies $0 \le n < M_{rep}^{NPUSCH} N_{slots}^{UL} N_{RU} + \text{offset}$, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, and $N_{RU}$ is a quantity of resource units occupied by one data block.

In some embodiments, the time interval, the transmission duration of the first reference signal, the third sequence, and the first reference signal satisfy the following formula:

$$r_u(n) = \frac{1}{\sqrt{2}}(1 + j)(1 - 2c(n + \text{offset}))w(n \bmod 16),$$

$$0 \le n < M_{rep}^{NPUSCH} N_{slots}^{UL} N_{RU},$$

where $r_u(n)$ is the first reference signal, $c(n+\text{offset})$ is the third sequence, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, and $N_{RU}$ is a quantity of resource units occupied by one data block.

According to a third aspect, a communication method is provided. The method is applicable to a wireless communication system. The wireless communication system includes a first cell. The first cell includes a plurality of terminal devices that can transmit uplink data on a same uplink time-frequency resource. The plurality of terminal devices include a first terminal device. The method includes: determining, by the first terminal device, a reference time domain position, where the reference time domain position is the same as a reference time domain position determined by another terminal device in the plurality of terminal devices, and the reference time domain position is used to initialize a first sequence; generating, by the first terminal device, a first reference signal based on the first sequence and a time interval, where the time interval is an interval between the reference time domain position and a start time domain position of transmission of the first reference signal; and sending, by the first terminal device, the first reference signal to a network device.

It should be noted that, the reference time domain position in this embodiment of this application may be related to a preconfigured uplink time-frequency resource, or may not be related to the preconfigured uplink time-frequency resource, and is an absolute position. A general description is provided herein.

For a technical effect brought by the third aspect, refer to the technical effect brought by the first aspect. Details are not described herein again.

According to a fourth aspect, a communication method is provided. The method is applicable to a wireless communication system. The wireless communication system includes a first cell. The first cell includes a plurality of terminal devices that can transmit uplink data on a same uplink time-frequency resource. The plurality of terminal devices include a first terminal device. The method includes: determining, by a network device, a reference time domain position, where the reference time domain position is the same as a reference time domain position determined by another terminal device in the plurality of terminal devices, and the reference time domain position is used to initialize a first sequence; generating, by the network device, a first reference signal based on the first sequence and a time interval, where the time interval is an interval between the reference time domain position and a start time domain position of transmission of the first reference signal; receiving, by the network device, a second reference signal from the first terminal device; and demodulating, by the network device, uplink data from the first terminal device based on the first reference signal and the second reference signal.

It should be noted that, the reference time domain position in this embodiment of this application may be related to a preconfigured uplink time-frequency resource, or may not be related to the preconfigured uplink time-frequency resource, and is an absolute position. A general description is provided herein.

For a technical effect brought by the fourth aspect, refer to the technical effect brought by the first aspect. Details are not described herein again.

According to a fifth aspect, a first terminal device is provided. The first terminal device is applicable to a wireless communication system. The wireless communication system includes a first cell. The first cell includes a plurality of terminal devices that can transmit uplink data on a same uplink time-frequency resource. The plurality of terminal devices include the first terminal device. The first terminal device includes a transceiver module (e.g., a device, one or more circuits) and a processing module (e.g., a device, one or more circuits). The processing module is configured to determine a reference time domain position based on a preconfigured uplink time-frequency resource, where the reference time domain position is the same as a reference time domain position determined by another terminal device in the plurality of terminal devices, and the reference time domain position is used to initialize a first sequence. The processing module is configured to generate a first reference signal based on the first sequence and a time interval, where the time interval is an interval between the reference time domain position and a start time domain position of transmission of the first reference signal. The transceiver module is configured to send the first reference signal to a network device.

In some embodiments, the reference time domain position is a time domain position before a start time domain position of the preconfigured uplink time-frequency resource in a periodicity of the preconfigured uplink time-frequency resource.

In some embodiments, the reference time domain position is a start position of the periodicity of the preconfigured uplink time-frequency resource.

In some embodiments, the start position of the periodicity of the preconfigured uplink time-frequency resource satisfies: (Subframe number corresponding to the start position) mod (Periodicity of the preconfigured uplink time-frequency resource/First specified value)=0; or (Frame number corresponding to the start position) mod (Periodicity of the preconfigured uplink time-frequency resource/Second specified value)=0, where mod( ) represents modulo, and the first specified value or the second specified value is a positive number.

In some embodiments, the reference time domain position is a start time domain position of the preconfigured uplink time-frequency resource.

In some embodiments, that the processing module is configured to determine a reference time domain position based on a preconfigured uplink time-frequency resource includes: the transceiver module is configured to receive first indication information from the network device, where the first indication information is used to indicate first offset duration of the reference time domain position relative to the start position of the periodicity of the preconfigured uplink time-frequency resource; and the processing module is configured to determine the reference time domain position based on the first indication information and the start position of the periodicity of the preconfigured uplink time-frequency resource.

In some embodiments, that the processing module is configured to determine a reference time domain position based on a preconfigured uplink time-frequency resource includes: the transceiver module is configured to receive second indication information from the network device, where the second indication information is used to indicate second offset duration of the start time domain position of the preconfigured uplink time-frequency resource relative to the reference time domain position; and the processing module is configured to determine the reference time domain position based on the second indication information and the start time domain position of the preconfigured uplink time-frequency resource.

In some embodiments, that the processing module is configured to generate a first reference signal based on the first sequence and a time interval includes: the processing module is configured to generate, based on the first sequence and the time interval, the first reference signal whose length is transmission duration of the first reference signal.

In some embodiments, the first sequence is a Gold sequence, and the first sequence, the time interval, the transmission duration of the first reference signal, and the first reference signal satisfy the following formula:

$$r_u(n - \text{offset}) = \frac{1}{\sqrt{2}}(1 + j)(1 - 2c(n))w(n \bmod 16),$$

$$\text{offset} \le n < M_{rep}^{NPUSCH} N_{slots}^{UL} N_{RU} + \text{offset},$$

where $r_u$ (n) is the first reference signal, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, c(n) is a Gold sequence, and w(n) is a Hadamard sequence.

In some embodiments, that the processing module is configured to generate a first reference signal based on the first sequence and a time interval includes: the processing module is configured to generate, based on the first sequence, a second sequence whose duration is a sum of the time interval and transmission duration of the first reference signal; and the processing module is configured to determine that a sequence whose length is the transmission duration of the first reference signal and that is in the second sequence is the first reference signal, where a distance between the first value of the first reference signal and the first value of the second sequence is the time interval.

In some embodiments, the first sequence is a Gold sequence, and the first sequence, the time interval, the transmission duration of the first reference signal, and the second sequence satisfy the following formula:

$$X(n) = \frac{1}{\sqrt{2}}(1 + j)(1 - 2c(n))w(n \bmod 16),$$

$$0 \le n < M_{rep}^{NPUSCH} N_{slots}^{UL} N_{RU} + \text{offset},$$

where X(n) is the second sequence, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, c(n) is a Gold sequence, and w(n) is a Hadamard sequence.

In some embodiments, the first reference signal is $r_u$ (n), where $r_u$ (n−offset)=X(n), and a value range of n satisfies: offset$\le$n<$M_{rep}^{NPUSCH} N_{slots}^{UL} N_{RU}$+offset.

In some embodiments, the first sequence is a Gold sequence, and the first sequence, the time interval, the transmission duration of the first reference signal, and the first reference signal satisfy the following formula:

$$r_u(n) = \frac{1}{\sqrt{2}}(1 + j)(1 - 2c(n + \text{offset}))w(n \bmod 16),$$

$$0 \le n < M_{rep}^{NPUSCH} N_{slots}^{UL} N_{RU},$$

where $r_u$ (n) is the first reference signal, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, c(n) is a Gold sequence, and w(n) is a Hadamard sequence.

In some embodiments, a length of the first sequence is a sum of the time interval and transmission duration of the first reference signal. That the processing module is configured to generate a first reference signal based on the first sequence and a time interval includes: the processing module is configured to determine that a sequence whose length is the transmission duration of the first reference signal and that is in the first sequence is a third sequence, where a distance between the first value of the third sequence and the first value of the first sequence is the time interval; and the processing module is configured to generate the first reference signal based on the third sequence.

In some embodiments, the first sequence is a Gold sequence c(n) where a value range of n satisfies 0$\le$n<$M_{rep}^{NPUSCH} N_{slots}^{UL} N_{RU}$+offset, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, and $N_{RU}$ is a quantity of resource units occupied by one data block.

In some embodiments, the time interval, the transmission duration of the first reference signal, the third sequence, and the first reference signal satisfy the following formula:

$$r_u(n) = \frac{1}{\sqrt{2}}(1 + j)(1 - 2c(n + \text{offset}))w(n \bmod 16),$$

$$0 \le n < M_{rep}^{NPUSCH} N_{slots}^{UL} N_{RU},$$

where $r_u$(n) is the first reference signal, c(n+offset) is the third sequence, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, and $N_{RU}$ is a quantity of resource units occupied by one data block.

According to a sixth aspect, a network device is provided. The network device is applicable to a wireless communication system. The wireless communication system includes a first cell. The first cell includes a plurality of terminal devices that can transmit uplink data on a same uplink time-frequency resource. The plurality of terminal devices include a first terminal device. The network device includes a processing module and a transceiver module. The processing module is configured to determine a reference time domain position based on a preconfigured uplink time-frequency resource, where the reference time domain position is the same as a reference time domain position determined by another terminal device in the plurality of terminal devices, and the reference time domain position is used to initialize a first sequence. The processing module is configured to generate a first reference signal based on the first sequence and a time interval, where the time interval is an interval between the reference time domain position and a start time domain position of transmission of the first reference signal. The transceiver module is configured to receive a second reference signal from the first terminal device. The processing module is configured to demodulate uplink data from the first terminal device based on the first reference signal and the second reference signal.

In some embodiments, the reference time domain position is a time domain position before a start time domain position of the preconfigured uplink time-frequency resource in a periodicity of the preconfigured uplink time-frequency resource.

In some embodiments, the reference time domain position is a start position of the periodicity of the preconfigured uplink time-frequency resource.

In some embodiments, the start position of the periodicity of the preconfigured uplink time-frequency resource satisfies: (Subframe number corresponding to the start position) mod (Periodicity of the preconfigured uplink time-frequency resource/First specified value)=0; or (Frame number corresponding to the start position) mod (Periodicity of the preconfigured uplink time-frequency resource/Second specified value)=0, where mod( ) represents modulo, and the first specified value or the second specified value is a positive number.

In some embodiments, the reference time domain position is a start time domain position of the preconfigured uplink time-frequency resource.

In some embodiments, that the processing module is configured to determine a reference time domain position based on a preconfigured uplink time-frequency resource includes: the processing module is configured to determine first indication information, where the first indication information is used to indicate first offset duration of the reference time domain position relative to the start position of the periodicity of the preconfigured uplink time-frequency resource; and the processing module is configured to determine the reference time domain position based on the first indication information and the start position of the periodicity of the preconfigured uplink time-frequency resource.

In some embodiments, that the processing module is configured to determine a reference time domain position based on a preconfigured uplink time-frequency resource includes: the processing module is configured to determine second indication information, where the second indication information is used to indicate second offset duration of the start time domain position of the preconfigured uplink time-frequency resource relative to the reference time domain position; and the processing module is configured to determine the reference time domain position based on the second indication information and the start time domain position of the preconfigured uplink time-frequency resource.

In some embodiments, that the processing module is configured to generate a first reference signal based on the first sequence and a time interval includes: the processing module is configured to generate, based on the first sequence and the time interval, the first reference signal whose length is transmission duration of the first reference signal.

In some embodiments, the first sequence is a Gold sequence, and the first sequence, the time interval, the transmission duration of the first reference signal, and the first reference signal satisfy the following formula:

$$r_u(n-\text{offset}) = \frac{1}{\sqrt{2}}(1+j)(1-2c(n))w(n \bmod 16),$$

$$\text{offset} \leq n < M_{rep}^{NPUSCH} N_{slots}^{UL} N_{RU} + \text{offset},$$

where $r_u(n)$ is the first reference signal, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, $c(n)$ is a Gold sequence, and $w(n)$ is a Hadamard sequence.

In some embodiments, that the processing module is configured to generate a first reference signal based on the first sequence and a time interval includes: the processing module is configured to generate, based on the first sequence, a second sequence whose duration is a sum of the time interval and transmission duration of the first reference signal; and the processing module is configured to determine that a sequence whose length is the transmission duration of the first reference signal and that is in the second sequence is the first reference signal, where a distance between the first value of the first reference signal and the first value of the second sequence is the time interval.

In some embodiments, the first sequence is a Gold sequence, and the first sequence, the time interval, the transmission duration of the first reference signal, and the second sequence satisfy the following formula:

$$X(n) = \frac{1}{\sqrt{2}}(1+j)(1-2c(n))w(n \bmod 16),$$

$$0 \leq n < M_{rep}^{NPUSCH} N_{slots}^{UL} N_{RU} + \text{offset},$$

where $X(n)$ is the second sequence, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, $c(n)$ is a Gold sequence, and $w(n)$ is a Hadamard sequence.

In some embodiments, the first reference signal is $\overline{r_u}(n)$, where $r_u(n-\text{offset})=X(n)$, and a value range of n satisfies: offset$\leq$n$<M_{rep}^{NPUSCH} N_{slots}^{UL} N_{RU}$+offset.

In some embodiments, the first sequence is a Gold sequence, and the first sequence, the time interval, the transmission duration of the first reference signal, and the first reference signal satisfy the following formula:

$$r_u(n) = \frac{1}{\sqrt{2}}(1+j)(1-2c(n+\text{offset}))w(n \bmod 16),$$

$$0 \leq n < M_{rep}^{NPUSCH} N_{slots}^{UL} N_{RU},$$

$r_u(n)$ is the first reference signal, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, $c(n)$ is a Gold sequence, and $w(n)$ is a Hadamard sequence.

In some embodiments, a length of the first sequence is a sum of the time interval and transmission duration of the first reference signal. That the processing module is configured to generate a first reference signal based on the first sequence and a time interval includes: the processing module is configured to determine that a sequence whose length is the transmission duration of the first reference signal and that is in the first sequence is a third sequence, where a distance between the first value of the third sequence and the first value of the first sequence is the time interval; and the processing module is configured to generate the first reference signal based on the third sequence.

In some embodiments, the first sequence is a Gold sequence c(n) where a value range of n satisfies $0 \leq n < M_{rep}^{NPUSCH} N_{slots}^{UL} N_{RU}$+offset, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, and $N_{RU}$ is a quantity of resource units occupied by one data block.

In some embodiments, the time interval, the transmission duration of the first reference signal, the third sequence, and the first reference signal satisfy the following formula:

$$r_u(n) = \frac{1}{\sqrt{2}}(1+j)(1-2c(n+\text{offset}))w(n \bmod 16),$$

$$0 \leq n < M_{rep}^{NPUSCH} N_{slots}^{UL} N_{RU},$$

where $r_u(n)$ is the first reference signal, c(n+offset) is the third sequence, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, and $N_{RU}$ is a quantity of resource units occupied by one data block.

According to a seventh aspect, a first terminal device is provided. The first terminal device is applicable to a wireless communication system. The wireless communication system includes a first cell. The first cell includes a plurality of terminal devices that can transmit uplink data on a same uplink time-frequency resource. The plurality of terminal devices include the first terminal device. The first terminal device includes a transceiver module and a processing module. The processing module is configured to determine a reference time domain position, where the reference time domain position is the same as a reference time domain position determined by another terminal device in the plurality of terminal devices, and the reference time domain position is used to initialize a first sequence. The processing module is configured to generate a first reference signal based on the first sequence and a time interval, where the time interval is an interval between the reference time domain position and a start time domain position of transmission of the first reference signal. The transceiver module is configured to send the first reference signal to a network device.

According to an eighth aspect, a network device is provided. The network device is applicable to a wireless communication system. The wireless communication system includes a first cell. The first cell includes a plurality of terminal devices that can transmit uplink data on a same uplink time-frequency resource. The plurality of terminal devices include a first terminal device. The network device includes a processing module and a transceiver module. The processing module is configured to determine a reference time domain position, where the reference time domain position is the same as a reference time domain position determined by another terminal device in the plurality of terminal devices, and the reference time domain position is used to initialize a first sequence. The processing module is configured to generate a first reference signal based on the first sequence and a time interval, where the time interval is an interval between the reference time domain position and a start time domain position of transmission of the first reference signal. The transceiver module is configured to receive a second reference signal from the first terminal device. The processing module is configured to demodulate uplink data from the first terminal device based on the first reference signal and the second reference signal.

According to a ninth aspect, a communication apparatus is provided, and includes a processor and a memory. The memory is configured to store a program. The processor invokes the program stored in the memory, to perform the communication method according to the first aspect or the third aspect.

According to a tenth aspect, a communication apparatus is provided, and includes a processor and a memory. The memory is configured to store a program. The processor invokes the program stored in the memory, to perform the communication method according to the second aspect or the fourth aspect.

According to an eleventh aspect, a computer-readable storage medium is provided. The computer-readable storage medium stores instructions. When the instructions are run on a computer or a processor, the computer or the processor is enabled to perform the communication method according to any one of the first aspect or the possible implementations of the first aspect, perform the communication method according to any one of the second aspect or the possible implementations of the second aspect, perform the communication method according to any one of the third aspect or the possible implementations of the third aspect, or perform the communication method according to any one of the fourth aspect or the possible implementations of the fourth aspect.

According to a twelfth aspect, a computer program product including instructions is provided. When the instructions are run on a computer or a processor, the computer or the processor is enabled to perform the communication method according to any one of the first aspect or the possible implementations of the first aspect, perform the communication method according to any one of the second aspect or the possible implementations of the second aspect, perform the communication method according to any one of the third aspect or the possible implementations of the third aspect, or perform the communication method according to any one of the fourth aspect or the possible implementations of the fourth aspect.

According to a thirteenth aspect, a communication system is provided, and includes the first terminal device according to the fifth aspect and the network device according to the sixth aspect, includes the first terminal device according to the seventh aspect and the network device according to the eighth aspect, or includes the communication apparatus according to the ninth aspect and the communication apparatus according to the tenth aspect.

For technical effects of the third aspect to the thirteenth aspect, refer to the content in the possible implementations of the first aspect and the second aspect.

DESCRIPTION OF EMBODIMENTS

Figure 1:
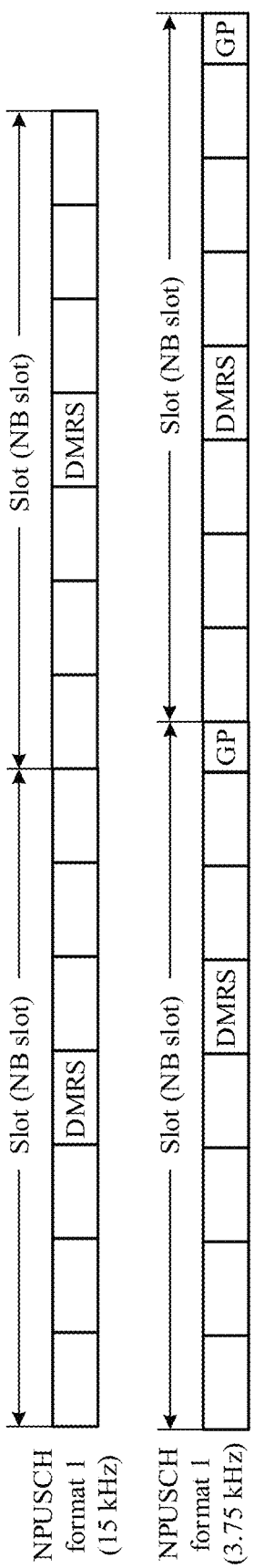
FIG. 1 is a schematic diagram of existing DMRS positions.

Embodiments of this application may be applied to a time division duplexing (TDD) scenario, or are applicable to a frequency division duplexing (FDD) scenario.

The embodiments of this application are described based on a 5G network scenario in a wireless communication network. It should be noted that, the solutions in the embodiments of this application may be used in another wireless communication network, and a corresponding name may be replaced with a name of a corresponding function in the another wireless communication network.

The embodiments of this application are applicable to a long term evolution (LTE) system such as an NB-IoT system. The embodiments of this application may be applicable to other wireless communication systems, for example, a global system for mobile communication (GSM), a universal mobile telecommunications system (UMTS), a code division multiple access (CDMA) system, and a new network device system. Specific embodiments are described by using the LTE system as an example below.

For ease of understanding of the technical solutions in the embodiments of this application, the following first briefly describes technologies or nouns related to this application. First, IoT:

The IoT is "an internet for thing-to-thing connection". The IoT extends a user end of the internet between random objects, so that information exchange and communication can be performed between the random objects. Such a communication manner is also referred to as machine type communication (MTC). A communication node is referred to as an MTC terminal or an MTC device. Typical IoT application includes a smart grid, smart agriculture, smart transportation, smart household, environment detection, and various other aspects.

The internet of things needs to be applied to a plurality of scenarios, for example, from outdoor to indoor, and from overground to underground. Therefore, many special requirements are imposed on a design of the internet of things. For example, an MTC terminal in some scenarios is applied to an environment with poor coverage, for example, an electric meter or a water meter is usually installed indoors and even in a place, for example, a basement, with a quite poor wireless network signal. Therefore, a coverage enhancement technology is required to solve this problem. In some embodiments, a quantity of MTC terminals in some scenarios is far greater than a quantity of devices for human-to-human communication. That is, large-scale deployment is required. Therefore, it is required that the MTC terminals be obtained and used at quite low costs. In some embodiments, a data packet transmitted by an MTC terminal in some scenarios is quite small, and is insensitive to a delay. Therefore, it is required that an MTC terminal with a low rate be supported. In some embodiments, an MTC terminal is powered by using a battery. However, in many scenarios, the MTC terminal is required to be used for at least 10 years without replacing the battery. Therefore, it is required that the MTC terminal work with extremely low electric power consumption.

To satisfy the foregoing requirements, the mobile communication standardization organization 3GPP adopted a new research project at RAN #62 plenary session to study a method for supporting, in a cellular network, an internet of things having extremely low complexity and low costs. In addition, an NB-IoT project was initiated at the RAN #69 session.

Second, Uplink Data Transmission:

Different from long term evolution (LTE), NB-IoT uplink data transmission supports single-tone transmission and multi-tone transmission. A quantity of subcarriers corresponding to the single-tone transmission is 1, and the single-tone transmission is mainly applicable to low-rate and coverage enhancement scenarios, and can reduce implementation costs. A quantity of subcarriers corresponding to the multi-tone transmission is greater than 1, and multi-tone transmission can provide a higher rate than the single-tone transmission, and can support coverage enhancement. In addition, NB-IoT uplink transmission has two subcarrier spacings, namely, 15 kHz and 3.75 kHz. When a quantity of subcarriers is 1 (sometimes referred to as, single-tone), the two subcarrier spacings, namely, 15 kHz and 3.75 kHz are supported. When a quantity of subcarriers is greater than 1 (sometimes referred to as, multi-tone), only the subcarrier spacing, namely, 15 kHz, is supported.

A basic scheduling unit of the uplink data transmission is a resource unit (RU). When a subcarrier spacing is 3.75 kHz, an NB-IoT system supports only the single-tone transmission. One RU occupies one subcarrier in frequency domain and occupies 16 slots in time domain. When a subcarrier spacing is 15 kHz, the following RUs are defined in Table 1 ($N_{sc}^{RU}$ indicates a quantity of subcarriers occupied by one RU in frequency domain, and $N_{slots}^{UL}$ indicates a quantity of consecutive slots occupied by one RU in time domain). Each slot includes seven single-carrier frequency division multiple access (SC-FDMA) symbols (symbol).

TABLE 1

| $N_{sc}^{RU}$ | $N_{slots}^{UL}$ |
|---|---|
| 1 | 16 |
| 3 | 8 |
| 6 | 4 |
| 12 | 2 |

In addition, there may be a repetition in the uplink data transmission. One data block occupies M RUs. Quantity of repetitions=N. It indicates that uplink transmission this time occupies N*M RUs. That is, the repetitions (repetition) are in a unit of M*RU.

Third, DMRS:

An NB-IoT narrowband physical uplink shared channel ( ) format 1 is used to transmit uplink data. In a process of transmitting the uplink data, a terminal device simultaneously sends the DMRS. The DMRS is used by a network device to perform channel estimation and channel equalization, to correctly demodulate uplink data. As shown in FIG. 1, when the uplink data is transmitted, one SC-FDMA symbol in one slot is used to transmit the DMRS, and six remaining SC-FDMA symbols are used to transmit the uplink data. For guard periods (GP) in FIG. 1, refer to existing related descriptions. Details are not described herein.

As described above, there are two transmission modes for the uplink data transmission: the single-tone transmission and the multi-tone transmission. For the single-tone transmission, there are two subcarrier spacings: 3.75 kHz and 15 kHz. For the single-tone transmission, one RU occupies 16 slots regardless of the subcarrier spacing. For 3.75 kHz and 15 kHz of the single-tone transmission, DMRS generation manners are the same, and only DMRS mapping is different. The embodiments of this application mainly relate to the DMRS generation manner, and specific DMRS mapping during the uplink data transmission is not specifically limited in the embodiments of this application.

For example, the DMRS may be generated with reference to the following formula (1) and formula (2):

$$\overline{r_u}(n) = \frac{1}{\sqrt{2}}(1+j)(1-2c(n))w(n \bmod 16), \quad \text{formula (1)}$$

$$0 \le n < M_{rep}^{NPUSCH} N_{slots}^{UL} N_{RU}$$

$$r_u(n) = \overline{r_u}(n) \quad \text{formula (2)}$$

c(n) represents a Gold (Gold) sequence, and in a conventional technology, c(n) is initialized at an NPUSCH transmission start position. An initialization seed is $C_{init}=35$. w(n) represents a Hadamard (Hadamard) sequence. $r_u$ (n) represents a DMRS sequence. $M_{rep}^{NPUSCH}$ represents a quantity of repetitions of an NPUSCH. $N_{slots}^{UL}$ represents a quantity of consecutive slots occupied by one RU, and for example, may be 16. $N_{RU}$ represents a quantity of RUs occupied by one data block. mod( ) represents modulo.

The following describes a method for generating the Gold sequence c(n).

A manner of generating the Gold sequence c(n) is shown in the following formula (3):

$$c(n)=(x_1(n+N_C)+x_2(n+N_C)) \bmod 2 \quad \text{formula (3)}$$

A length of the Gold sequence c(n) is denoted as $M_{PN}$. That is, a value range of n is: 0, 1, . . . , and $M_{PN-1}$. $x_1$ (n+$N_C$) and $x_2$ (n+$N_C$) are two sequences for generating c(n). $N_C$=1600. mod( ) represents modulo.

The foregoing sequence $x_1$ (n+$N_C$) may be determined by using the following formula (4):

$$x_1(n+31)=(x_1(n+3)+x_1(n)) \bmod 2 \quad \text{formula (4)}$$

An initialization seed of the sequence $x_1$(n+$N_C$) is $x_1(0)=1$, $x_1(n)=0$, n=1, 2, . . . 30.

The foregoing sequence $x_2$ (n+$N_C$) may be determined by using the following formula (5):

$$x_2(n+31)=(x_2(n+3)+x_2(n+2)+x_2(n+1)+x_2(n)) \bmod 2 \quad \text{formula (5)}$$

In some embodiments, a value of an initialization seed of the sequence $x_2$ (n+$N_C$) is related to specific application. During generation of the DMRS sequence, the initialization seed of the sequence $x_2$(n+$N_C$) is 35. The sequence $x_2$(n+$N_C$) may be obtained by using a formula $c_{init}=\Sigma_{i=0}^{30} x_2(i) \cdot 2^i$ and $C_{init}=35$.

The Hadamard sequence w(n) of a length that is 16 is shown in Table 2.

TABLE 2

| u | w(0), . . . , w(15) | | | | | | | | | | | | | | | |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 1 | −1 | 1 | −1 | 1 | −1 | 1 | −1 | 1 | −1 | 1 | −1 | 1 | −1 | 1 | −1 |
| 2 | 1 | 1 | −1 | −1 | 1 | 1 | −1 | −1 | 1 | 1 | −1 | −1 | 1 | 1 | −1 | −1 |
| 3 | 1 | −1 | −1 | 1 | 1 | −1 | −1 | 1 | 1 | −1 | −1 | 1 | 1 | −1 | −1 | 1 |
| 4 | 1 | 1 | 1 | 1 | −1 | −1 | −1 | −1 | 1 | 1 | 1 | 1 | −1 | −1 | −1 | −1 |
| 5 | 1 | −1 | 1 | −1 | −1 | 1 | −1 | 1 | 1 | −1 | 1 | −1 | −1 | 1 | −1 | 1 |
| 6 | 1 | 1 | −1 | −1 | −1 | −1 | 1 | 1 | 1 | 1 | −1 | −1 | −1 | −1 | 1 | 1 |
| 7 | 1 | −1 | −1 | 1 | −1 | 1 | 1 | −1 | 1 | −1 | −1 | 1 | −1 | 1 | 1 | −1 |
| 8 | 1 | 1 | 1 | 1 | 1 | 1 | 1 | 1 | −1 | −1 | −1 | −1 | −1 | −1 | −1 | −1 |
| 9 | 1 | −1 | 1 | −1 | 1 | −1 | 1 | −1 | −1 | 1 | −1 | 1 | −1 | 1 | −1 | 1 |
| 10 | 1 | 1 | −1 | −1 | 1 | 1 | −1 | −1 | −1 | −1 | 1 | 1 | −1 | −1 | 1 | 1 |
| 11 | 1 | −1 | −1 | 1 | 1 | −1 | −1 | 1 | −1 | 1 | 1 | −1 | −1 | 1 | 1 | −1 |

TABLE 2-continued

| u | w(0), . . . , w(15) | | | | | | | | | | | | | | | |
|---|---|---|---|---|---|---|---|---|---|---|---|---|---|---|---|---|
| 12 | 1 | 1 | 1 | 1 | −1 | −1 | −1 | −1 | −1 | −1 | −1 | −1 | 1 | 1 | 1 | 1 |
| 13 | 1 | −1 | 1 | −1 | −1 | 1 | −1 | 1 | −1 | 1 | −1 | 1 | 1 | −1 | 1 | −1 |
| 14 | 1 | 1 | −1 | −1 | −1 | −1 | 1 | 1 | −1 | −1 | 1 | 1 | 1 | 1 | −1 | −1 |
| 15 | 1 | −1 | −1 | 1 | −1 | 1 | 1 | −1 | −1 | 1 | 1 | −1 | 1 | −1 | −1 | 1 | u in Table 2 is an index of the Hadamard sequence w(n). Hadamard sequences corresponding to different indexes of the Hadamard sequences w(n) are orthogonal to each other. For the single-tone transmission, one RU occupies 16 slots regardless of a subcarrier spacing. Each of the 16 slots may correspond to one Hadamard sequence w(n) of the length that is 16.

In the conventional technology, a calculation formula of the index u of the Hadamard sequence w(n) in a group hopping scenario is different from a calculation formula of the index u of the Hadamard sequence w(n) in a non-group hopping scenario.

The calculation formula of the index u of the Hadamard sequence w(n) in the non-group hopping scenario is the following formula (6):

$$u = N_{ID}^{Ncell} \bmod 16 \quad \text{formula (6)}$$

$N_{ID}^{Ncell}$ represents a cell identifier. mod( ) represents modulo.

According to the foregoing formula (6), for example, one data block occupies two RUs, the NPUSCH is repeated twice, and there are four RUs in total. In this case, a mapping relationship between the cell identifier and indexes u of Hadamard sequences w(n) used by the RUs may be shown in Table 3. It can be learned from Table 3 that, in this case, the indexes u of the Hadamard sequences w(n) used by all the RUs are the same. Indexes a of Hadamard sequences w(n) used by intra-frequency cells such as a cell 0 and a cell 16 are completely the same.

TABLE 3

| Cell identifier | Index u of a Hadamard sequence used by an RU 1 | Index u of a Hadamard sequence used by an RU 2 | Index u of a Hadamard sequence used by an RU 3 | Index u of a Hadamard sequence used by an RU 4 |
|---|---|---|---|---|
| 0 | 0 | 0 | 0 | 0 |
| 1 | 1 | 1 | 1 | 1 |
| 2 | 2 | 2 | 2 | 2 |
| . . . | . . . | . . . | . . . | . . . |
| 13 | 13 | 13 | 13 | 13 |
| 14 | 14 | 14 | 14 | 14 |
| 15 | 15 | 15 | 15 | 15 |
| 16 | 16 | 16 | 16 | 16 |
| 17 | 17 | 17 | 17 | 17 |
| . . . | . . . | . . . | . . . | . . . |

The calculation formula of the index u of the Hadamard sequence w(n) in the group hopping scenario is the following formula (7):

$$u = (f_{gh}(n_s) + f_{ss}) \bmod N_{seq}^{RU} \quad \text{formula (7)}$$

$f_{gh}(n_s)$ represents a group hopping pattern (pattern). $f_{ss}$ represents a sequence shift pattern. mod represents modulo. $N_{seq}^{RU}$ represents a length of one RU, and for example, may be 16.

A calculation formula of $f_{gh}(n_s)$ is the following formula (8):

$$f_{gh}(n_s) = (\Sigma_{i=0}^{7} c(8n_s' + i) \cdot 2^i) \bmod N_{seq}^{RU} \quad \text{formula (8)}$$

c(n) represents a Gold sequence, and in the conventional technology, c(n) is initialized at a start position of each RU. An initialization seed is $$C_{init} = \left\lfloor \frac{N_{ID}^{Ncell}}{N_{seq}^{RU}} \right\rfloor.$$

$\lfloor \ \rfloor$ represents rounding down. $N_{ID}^{Ncell}$ represents a cell identifier. $N_{seq}^{RU}$ represents the length of the RU, and for example, may be 16. For the single-tone transmission, $n_s'$ is the first slot number of each RU. mod represents modulo. $N_{seq}^{RU}$ represents a length of one RU, and for example, may be 16.

A calculation formula of $f_{ss}$ is the following formula (9):

$$f_{ss} = (N_{ID}^{Ncell} + \Delta_{ss}) \bmod N_{seq}^{RU} \quad \text{formula (9)}$$

$N_{ID}^{Ncell}$ represents the cell identifier. mod( ) represents modulo. $N_{seq}^{RU}$ represents the length of the RU, and for example, may be 16. $\Delta_{ss} \in \{0, 1, \ldots, 29\}$ is a parameter configured by a higher layer. If this parameter is not configured, a default value is 0.

According to the foregoing formula (7) to formula (9), for example, one data block occupies two RUs, the NPUSCH is repeated twice, and there are four RUs in total. In this case, the index a of the Hadamard sequence may be determined by using $f_{gh}(n_s)$ and $f_{ss}$. A mapping relationship between the cell identifier and indexes u of Hadamard sequences used by the RUs may be shown in Table 4. It can be learned from Table 4 that, in this case, the indexes u of the Hadamard sequences used by all the RUs are different. Indexes u of Hadamard sequences used by intra-frequency cells such as a cell 0 and a cell 16 are different.

TABLE 4

| Cell identifier | Index u of a Hadamard sequence used by an RU 1 | Index u of a Hadamard sequence used by an RU 2 | Index u of a Hadamard sequence used by an RU 3 | Index u of a Hadamard sequence used by an RU 4 |
|---|---|---|---|---|
| 0 | 1 | 5 | 7 | 9 |
| 1 | 2 | 6 | 8 | 10 |
| 2 | 3 | 7 | 9 | 11 |
| . . . | . . . | . . . | . . . | . . . |
| 13 | 14 | 2 | 4 | 6 |
| 14 | 15 | 3 | 5 | 7 |
| 15 | 0 | 4 | 6 | 8 |
| 16 | 2 | 9 | 3 | 5 |
| 17 | 3 | 10 | 4 | 6 |
| . . . | . . . | . . . | . . . | . . . |

It should be noted that, values of the indexes u of the Hadamard sequences in Table 4 are merely an example. That when $C_{init}=0$, $f_{gh}(n_s)=1, 5, 7$, and 9; when $C_{init}=1$, $f_{gh}(n_s)=2, 9, 3$, and 5 is used as an example for description. When $f_{gh}(n_s)$ is another value, the values of the indexes u of the Hadamard sequences may be different from those in Table 4. This is not specifically limited in this embodiment of this application.

The following describes the technical solutions in the embodiments of this application with reference to the accompanying drawings in the embodiments of this application. In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the descriptions of this application, unless otherwise specified, "a plurality of" indicates two or more. "At least one of the following items (pieces)" or a similar expression thereof indicates any combination of these items, including a single item (piece) or any combination of a plurality of items (pieces). For example, at least one of a, b, or c may indicate: a; b; c; a and b; a and c; b and c; or a, b, and c, where a, b, and c may be singular or plural. In addition, for convenience of clear description of the technical solutions in the embodiments of this application, terms such as "first" and "second" are used in the embodiments of this application to distinguish between same objects or similar objects that have basically same functions and purposes. A person skilled in the art may understand that the terms such as "first" and "second" do not limit a quantity or an execution sequence, and the terms such as "first" and "second" do not indicate a definite difference. In addition, in the embodiments of this application, a word such as "example" or "for example" is used to represent giving an example, an illustration, or a description. Any embodiment or design scheme described as the word "example" or "for example" in the embodiments of this application should not be explained as being more preferred or having more advantages than another embodiment or design scheme. Exactly, use of the word such as "example" or "for example" is intended to present a relative concept in a specific manner for ease of understanding.

The embodiments of this application are applicable to an LTE system, for example, an NB-IoT system, or are applicable to another wireless communication system, for example, a global system for mobile communication (GSM), a universal mobile telecommunications system (UMTS), a code division multiple access (CDMA) system, a wideband code division multiple access (WCDMA) system, and a future-oriented new network device system. This is not specifically limited in the embodiments of this application. The foregoing communication systems applicable to this application are merely examples for description, and communication systems applicable to this application are not limited thereto. A general description is provided herein. Details are not described below again. In addition, the terms "system" and "network" may be interchanged.

Figure 2:
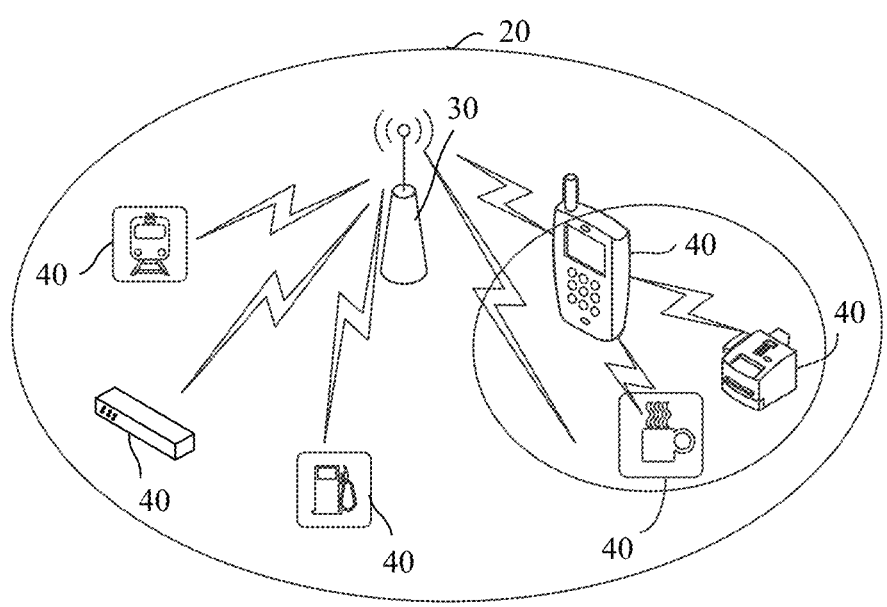
FIG. 2 is a schematic structural diagram of a communication system according to an embodiment of this application.

FIG. 2 shows a communication system 20 according to an embodiment of this application. The communication system 20 includes a network device 30 and a plurality of terminal devices 40 in a first cell covered by the network device 30. The plurality of terminal devices 40 can transmit uplink data on a same uplink time-frequency resource. In some embodiments, different terminal devices in the plurality of terminal devices 40 may communicate with each other. The first cell may be any one of one or more cells covered by the network device 30.

In this embodiment of this application, for example, the plurality of terminal devices 40 includes a first terminal device, and the first terminal device is any one of the plurality of terminal devices 40.

In some embodiments, the network device 30 in this embodiment of this application is a device for connecting the terminal devices 40 to a wireless network, and may be an evolved NodeB (evolutional Node B, eNB, or eNodeB) in long term evolution (long term evolution, LTE), a base transceiver station (BTS) in GSM or CDMA, a NodeB in a WCDMA system, a base station in a fifth generation (5G) network or a future evolved public land mobile network (PLMN), a broadband network gateway (BNG), an aggregation switch, a non-third generation partnership project (3GPP) access device, or the like. This is not specifically limited in this embodiment of this application. In some embodiments, the base station in this embodiment of this application may include base stations in various forms, for example, a macro base station, a micro base station (which is also referred to as a small cell), a relay station, and an access point. This is not specifically limited in this embodiment of this application.

In some embodiments, the terminal device 40 in this embodiment of this application may be a device, for example, a terminal or a chip that may be used in the terminal, configured to implement a wireless communication function. The terminal may be user equipment (UE), an access terminal, a terminal unit, a terminal station, a mobile station, a mobile station, a remote station, a remote terminal, a mobile device, a wireless communication device, a terminal agent, a terminal apparatus, or the like in the 5G network or the future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving (self driving), a wireless terminal in telemedicine (remote medical), a wireless terminal in a smart grid, a wireless terminal in transportation, a wireless terminal in a smart city, a wireless terminal in a smart home, or the like. The terminal may be mobile or at a fixed position.

In some embodiments, the network device 30 and the terminal device 40 in this embodiment of this application may also be referred to as communication apparatuses, and each may be a general-purpose device or a dedicated device. This is not specifically limited in this embodiment of this application.

Figure 3:
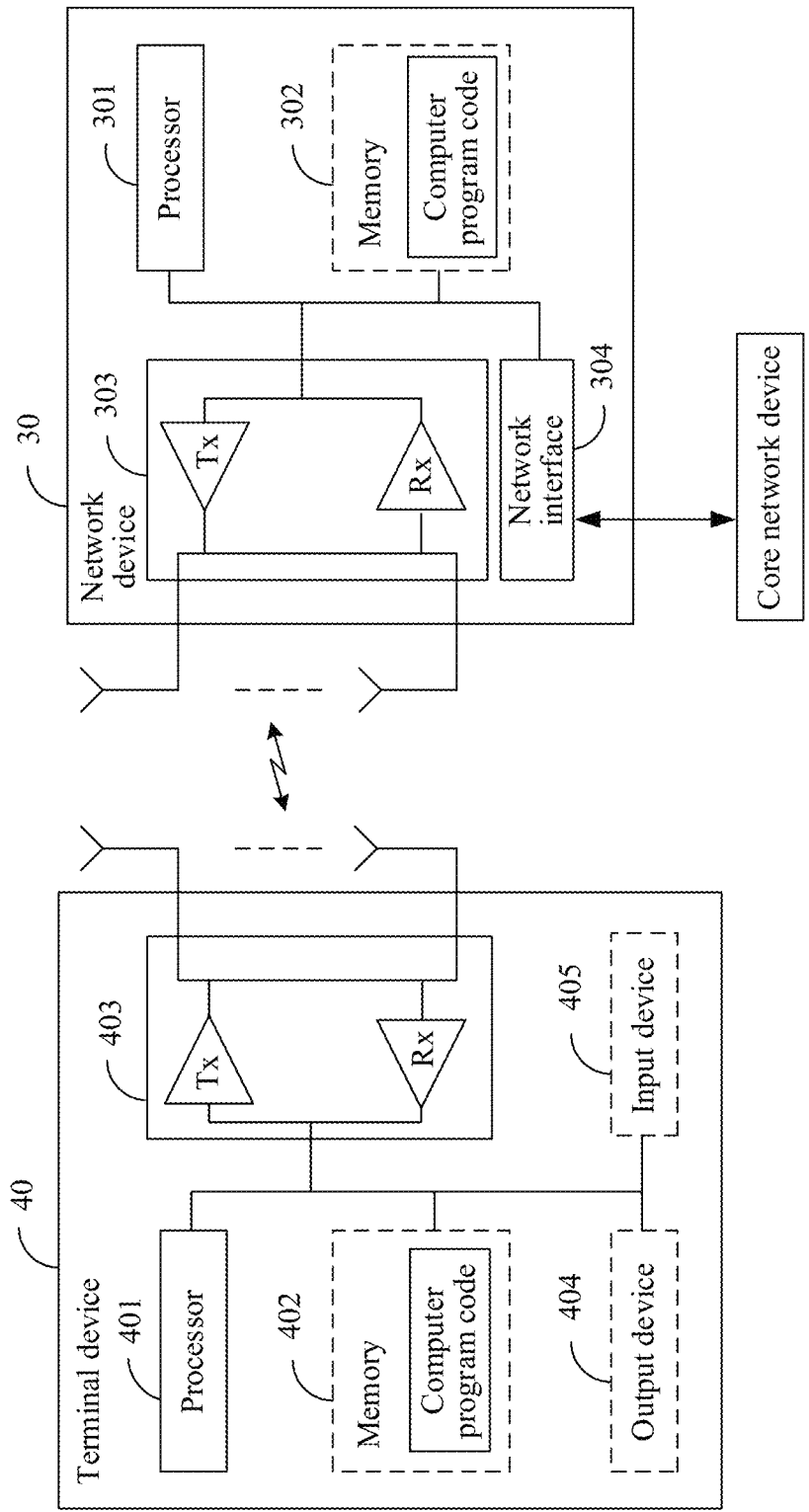
FIG. 3 is a schematic structural diagram of a terminal device and a network device according to an embodiment of this application.

In some embodiments, FIG. 3 is a schematic structural diagram of a network device 30 and a terminal device 40 according to an embodiment of this application.

The terminal device 40 includes at least one processor (an example in which the terminal device 40 includes one processor 401 is used for description in FIG. 3) and at least one transceiver (an example in which the terminal device 40 includes one transceiver 403 is used for description in FIG. 3). In some embodiments, the terminal device 40 may include at least one memory (an example in which the terminal device 40 includes one memory 402 is used for description in FIG. 3), at least one output device (an example in which the terminal device 40 includes one output device 404 is used for description in FIG. 3), and at least one input device (an example in which the terminal device 40 includes one input device 405 is used for description in FIG. 3).

The processor 401, the memory 402, and the transceiver 403 are connected through a communication line. The communication line may include a path transmitting information between the foregoing components.

The processor 401 may be a general-purpose central processing unit (central processing unit, CPU), a microprocessor, an application-specific integrated circuit (application-specific integrated circuit, ASIC), or one or more integrated circuits configured to control program execution of the solutions in this application. During specific implementation, in an embodiment, the processor 401 may include a plurality of CPUs, and the processor 401 may be a single-core (e.g., single-CPU) processor or a multi-core (e.g., multi-CPU) processor. The processor herein may refer to one or more devices, circuits, or processing cores configured to process data (for example, computer program instructions).

The memory 402 may be an apparatus having a storage function. For example, the memory 402 may be a read-only memory (ROM) or another type of static storage device that can store static information and instructions, or a random access memory (random access memory, RAM) or another type of dynamic storage device that can store information and instructions, or may be an electrically erasable programmable read-only memory (EEPROM), a compact disc read-only memory (CD-ROM) or another compact disc storage device, an optical disc storage device (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer, but is not limited thereto. The memory 402 may exist independently and is connected to the processor 401 through the communication line. In some embodiments, the memory 402 may be integrated with the processor 401.

The memory 402 is configured to store computer-executable instructions for performing the solutions in this application, and the processor 401 controls execution of the computer-executable instructions. In some embodiments, the processor 401 is configured to execute the computer-executable instructions stored in the memory 402, to implement the communication method in the embodiments of this application.

In some embodiments, the processor 401 may perform processing related functions in the communication method provided in the following embodiments of this application, and the transceiver 403 is responsible for communication with another device or a communication network. This is not specifically limited in this embodiment of this application.

In some embodiments, the computer-executable instructions in this embodiment of this application may also be referred to as application program code or computer program code. This is not specifically limited in this embodiment of this application.

The transceiver 403 may use any apparatus such as a transceiver, and is configured to communicate with the another device or the communication network such as the Ethernet, a radio access network (RAN), or a wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (liquid crystal display, LCD), a light emitting diode (LED) display device, a cathode ray tube (CRT) display device, or a projector.

The input device 405 communicates with the processor 401, and may receive an input of a user in a plurality of manners. For example, the input device 405 may be a mouse, a keyboard, a touchscreen device, or a sensor device.

The network device 30 includes at least one processor (an example in which the network device 30 includes one processor 301 is used for description in FIG. 3), at least one transceiver (an example in which the network device 30 includes one transceiver 303 is used for description in FIG. 3), and at least one network interface (an example in which the network device 30 includes one network interface 304 is used for description in FIG. 3). In some embodiments, the network device 30 may further include at least one memory (an example in which the network device 30 includes one memory 302 is used for description in FIG. 3). The processor 301, the memory 302, the transceiver 303, and the network interface 304 are connected through a communication line. The network interface 304 is configured to connect to a core network device through a link (for example, an S1 interface), or connect to a network interface of another network device through a wired or wireless link (for example, an X2 interface) (not shown in FIG. 3). This is not specifically limited in this embodiment of this application. In addition, for descriptions about the processor 301, the memory 302, and the transceiver 303, refer to descriptions about the processor 401, the memory 402, and the transceiver 403 in the terminal device 40. Details are not described again herein.

Figure 4:
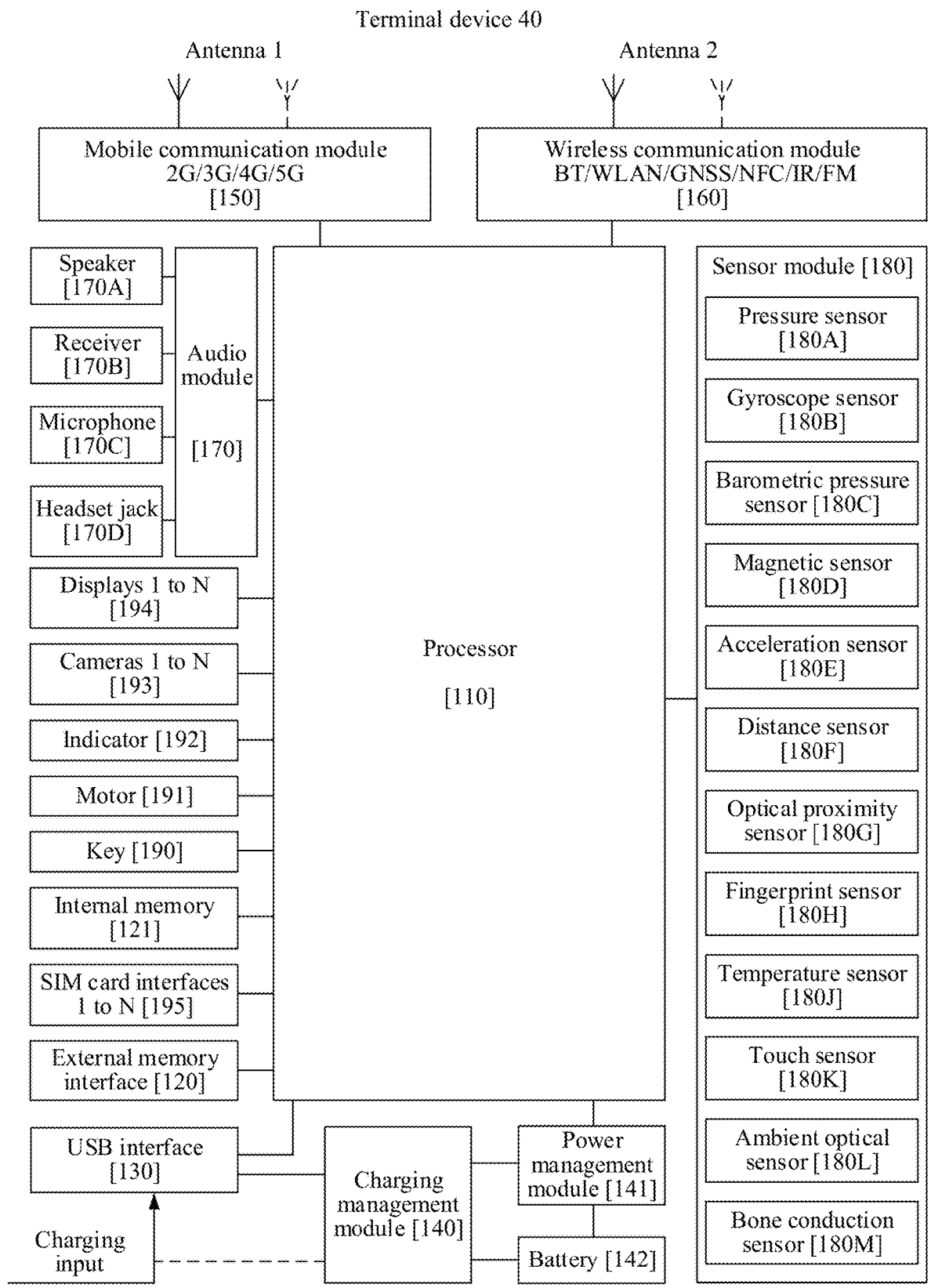
FIG. 4 is another schematic structural diagram of a terminal device according to an embodiment of this application.

With reference to the schematic structural diagram of the terminal device 40 shown in FIG. 3, for example, FIG. 4 shows a specific structural form of a terminal device 40 according to an embodiment of this application.

In some embodiments, a function of the processor 401 in FIG. 3 may be implemented by using a processor 110 in FIG. 4.

In some embodiments, a function of the transceiver 403 in FIG. 3 may be implemented by using an antenna 1, an antenna 2, a mobile communication module 150, a wireless communication module 160, and the like in FIG. 4.

The antenna 1 and the antenna 2 are configured to transmit and receive an electromagnetic wave signal. Each antenna in the terminal device 40 may be configured to cover one or more communication frequency bands. Different antennas may be multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution applied to wireless communication including 2G/3G/4G/5G or the like on the terminal device 40. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to a modem processor for demodulation. The mobile communication module 150 may amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same device.

The wireless communication module 160 may provide a solution applied to wireless communication including a wireless local area network (WLAN) (for example, a Wi-Fi network), Bluetooth (BT), a global navigational satellite system (GNSS), frequency modulation (FM), near field communication (NFC), an infrared technology (IR), or the like on the terminal device 40. The wireless communication module 160 may be one or more devices that integrate at least one communication processing module. The wireless communication module 160 receives an electromagnetic wave through the antenna 2, performs frequency modulation and filtering on an electromagnetic wave signal, and sends a processed signal to the processor 110. The wireless communication module 160 may receive a to-be-sent signal from the processor 110, perform frequency modulation and amplification on the signal, and convert a processed signal into an electromagnetic wave for radiation through the antenna 2. When the terminal device 40 is a first device, that the wireless communication module 160 may provide a solution applied to NFC wireless communication on the terminal device 40 means that the first device includes an NFC chip. The NFC chip can improve an NFC wireless communication function. When the terminal device 40 is a second device, that the wireless communication module 160 may provide a solution applied to NFC wireless communication on the terminal device 40 means that the first device includes an electronic label (for example, a radio frequency identification (RFID) label). An NFC chip, near the electronic label, of another device may perform NFC wireless communication with the second device.

In some embodiments, the antenna 1 of the terminal device 40 is coupled to the mobile communication module 150, and the antenna 2 is coupled to the wireless communication module 160, so that the terminal device 40 can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, or the like. The GNSS may include a global positioning system (GPS), a global navigation satellite system (GLONASS), a BeiDou navigation satellite system (BDS), a quasi-zenith satellite system (QZSS), and a satellite based augmentation system (SBAS).

In some embodiments, a function of the memory 402 in FIG. 3 may be implemented by using an internal memory 121, an external memory (for example, a Micro SD card) connected to an external memory interface 120 in FIG. 4, or the like.

In some embodiments, a function of the output device 404 in FIG. 3 may be implemented by using a display 194 in FIG. 4. The display 194 is configured to display an image, a video, and the like. The display 194 includes a display panel.

In some embodiments, a function of the input device 405 in FIG. 3 may be implemented by using a mouse, a keyboard, a touchscreen device, or a sensor module 180 in FIG. 4. For example, as shown in FIG. 4, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, and a bone conduction sensor 180M. This is not specifically limited in this embodiment of this application.

In some embodiments, as shown in FIG. 4, the terminal device 40 may include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C (which is also referred to as a "microphone" or a "microphone"), a headset jack 170D, or the like. This is not specifically limited in this embodiment of this application.

It may be understood that, the structure shown in FIG. 4 does not constitute a specific limitation on the terminal device 40. For example, in some other embodiments of this application, the terminal device 40 may include more or fewer components than those shown in the figure, or combine some components, or split some components, or have different component arrangements. The components shown in the figure may be implemented by hardware, software, or a combination of software and hardware.

With reference to FIG. 1 to FIG. 4, the following describes, by using an example in which the first terminal device in the plurality of terminal devices 40 and the network device shown in FIG. 2 interact with each other, the communication method provided in the embodiments of this application.

It should be noted that, names of messages between the network elements, names of parameters in the messages, or the like in the following embodiments of this application are merely an example, and there may be other names during specific implementation. This is not specifically limited in the embodiments of this application.

As described above, in a single-tone transmission mode, to support a plurality of terminal devices in transmitting uplink data on a same PUR, different terminal devices use orthogonal DMRS sequences. In some embodiments, the following solutions may be used.

Solution 1: Based on an existing DMRS sequence generation manner (to be specific, different terminal devices in a same cell use a same DMRS sequence), the different terminal devices use different indexes u of Hadamard code w(n), so that the different terminal devices use orthogonal DMRS sequences.

Solution 2: An existing DMRS sequence generation manner (to be specific, different terminal devices in a same cell use a same DMRS sequence) is used as a basic sequence, to allocate different cyclic shift indexes to the different terminal devices, to obtain different cyclic shifts. The basic sequence is cyclically shifted, so that the different terminal devices use the orthogonal DMRS sequences.

Regardless of which of the foregoing solutions is used, in the single-tone transmission mode, to enable the different terminal devices to use the orthogonal DMRS sequences when transmitting the uplink data, the different terminal devices need to start transmitting the uplink data at a same resource position.

When transmitting uplink data on a preconfigured uplink time-frequency resource, a terminal device is in an idle state. When the data arrives, the terminal device autonomously sends the data, and the data is not scheduled by a base station. The terminal device does not know whether another terminal device sends uplink data on a same preconfigured uplink time-frequency resource. The different terminal devices cannot start transmitting the uplink data at a same position on a same preconfigured uplink time-frequency resource through coordination of the base station. A simple method is limiting the terminal device to start transmitting the uplink data only at a start position of the preconfigured uplink time-frequency resource, to ensure that the different terminal devices can start transmitting the uplink data at a same time-frequency resource position. In addition, the orthogonal DMRS sequences are used to ensure that the base station can distinguish between the different terminal devices. Once uplink data needs to be transmitted after the start position of the preconfigured uplink time-frequency resource, sending of the uplink data needs to wait until a next preconfigured uplink time-frequency resource.

An embodiment of this application provides a communication method. When transmitting uplink data on a preconfigured uplink time-frequency resource, a terminal device does not need to start transmitting the uplink data only at a start position of the preconfigured uplink time-frequency resource. Even if uplink data needs to be transmitted after the start position of the preconfigured uplink time-frequency resource, the current preconfigured uplink time-frequency resource may be used to transmit the uplink data without waiting until a next preconfigured uplink time-frequency resource.

In some embodiments, to transmit uplink data after the start position of the preconfigured uplink time-frequency resource and before the next preconfigured uplink time-frequency resource, it needs to be ensured that, DMRS sequences corresponding to different terminal devices are orthogonal on a same time-frequency resource. However, according to the formula (1), a DMRS sequence is obtained by performing a linear operation on a Gold sequence c(n) and a Hadamard sequence w(n) On the same time-frequency resource, the different terminal devices may use different Hadamard indexes u shown in Table 2, so that Hadamard sequences w(n) corresponding to the different terminal devices are orthogonal. Therefore, only that Gold sequences c(n) corresponding to the different terminal devices are the same on the same time-frequency resource needs to be ensured.

Figure 5:
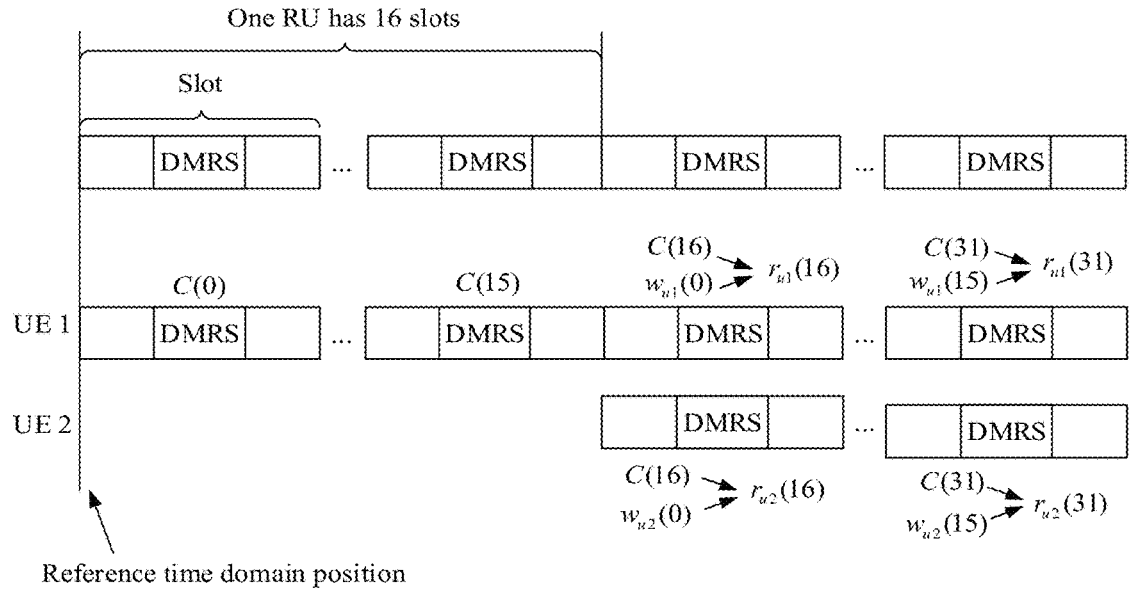
FIG. 5 is a schematic diagram of a DMRS sequence orthogonality principle according to an embodiment of this application.

For example, as shown in FIG. 5, it is assumed that two terminal devices (UE 1 and UE 2) send uplink data to a network device on a same preconfigured uplink time-frequency resource. The UE 1 starts sending uplink data at a start time domain position (namely, a $0^{th}$ slot position of the preconfigured uplink time-frequency resource) of the preconfigured uplink time-frequency resource. The UE 2 may start sending uplink data at a $16^{th}$ slot position of the preconfigured uplink time-frequency resource. At the $16^{th}$ slot position, Gold sequences c(n) corresponding to the UE 1 and the UE 2 are both c(16). A Hadamard sequence w(n) corresponding to the UE 1 is $w_{u1}(0)$. A Hadamard sequence w(n) corresponding to the UE 2 is $w_{u2}(0)$. A DMRS sequence generated by the UE 1 based on c(16) and $w_{u1}(0)$ is $r_{u1}(16)$. A DMRS sequence generated by the UE 2 based on c(16) and $w_{u1}(0)$ is $r_{u2}(16)$. At a subsequent slot position, the UE 1 and the UE 2 generate DMRS sequences in a manner similar to that at the $16^{th}$ slot position. On an RU including the $16^{th}$ slot position to a $31^{st}$ slot position, because Gold sequences corresponding to the UE 1 and the UE 2 are all c(16) to c(31) Gold sequences are the same. Hadamard sequences corresponding to the UE 1 are $w_{u1}(0)$ to $w_{u1}(15)$, and Hadamard sequences corresponding to the UE 2 are $w_{u2}(0)$ to $w_{u2}(15)$. Therefore, the Hadamard sequences are orthogonal. Therefore, on a same RU, the UE 1 and the UE 2 obtain orthogonal DMRS sequences by performing a linear operation (similar to the formula (1)) on the same Gold sequences and the orthogonal Hadamard sequences. The same applies to a subsequent RU.

To ensure that when uplink data is transmitted after a start position of a preconfigured uplink time-frequency resource and before a next preconfigured uplink time-frequency resource, Gold sequences c(n) corresponding to different terminal devices are the same on a same time-frequency resource, the Gold sequences c(n) first need to be initialized at a same position. In the embodiments of this application, the Gold sequences c(n) are initialized at a reference time domain position. Further, the embodiments of this application provide two manners of selecting a specific Gold sequence c(n). In one manner, a corresponding Gold sequence is directly selected starting from a start time domain position of DMRS signal transmission, and then a DMRS sequence is generated, so that the Gold sequences c(n) corresponding to the different terminal devices are the same. In the other manner, after a DMRS sequence is generated, a corresponding DMRS sequence is selected starting from a start time domain position of DMRS signal transmission, to implicitly enable the Gold sequences c(n) corresponding to the different terminal devices to be the same.

Figure 6:
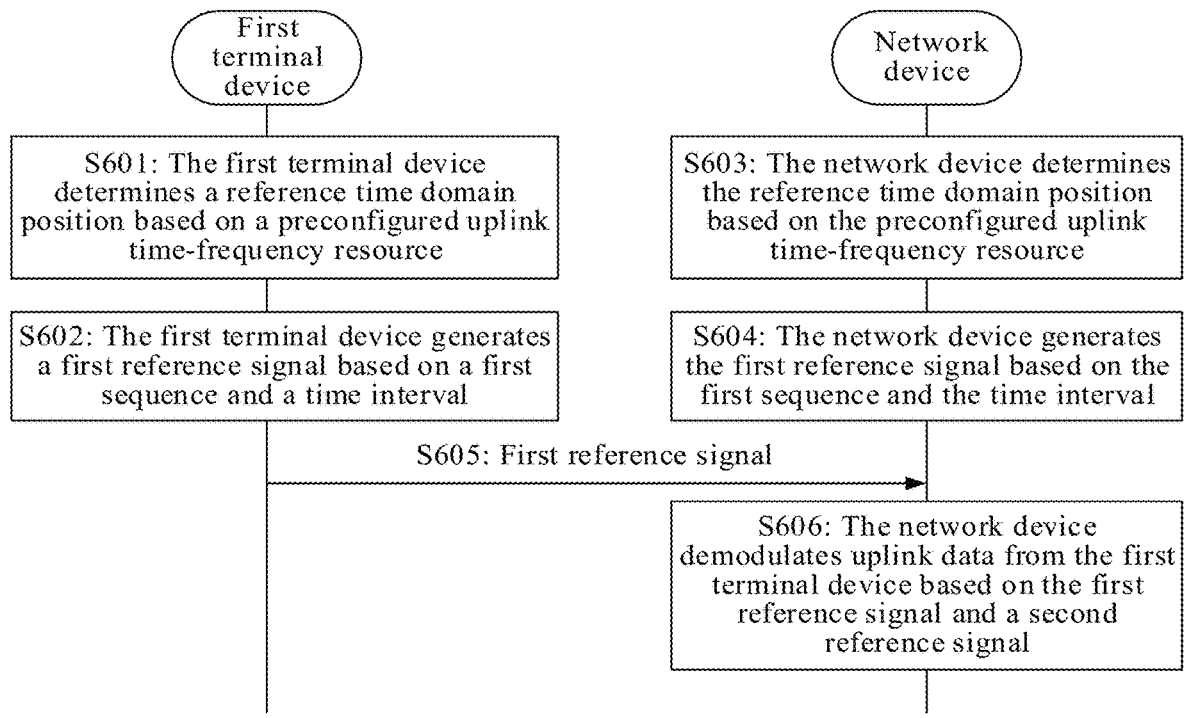
FIG. 6 shows a communication method 1 according to an embodiment of this application.

FIG. 6 shows a communication method according to an embodiment of this application. The communication method includes the following operations.

S601: A first terminal device determines a reference time domain position based on a preconfigured uplink time-frequency resource.

The reference time domain position is the same as a reference time domain position determined by another terminal device in a plurality of terminal devices.

In other words, in this embodiment of this application, a plurality of terminal devices that can transmit uplink data on a same uplink time-frequency resource correspond to a same reference time domain position.

In some embodiments, in this embodiment of this application, the reference time domain position is a time domain position before a start time domain position of the preconfigured uplink time-frequency resource in a periodicity of the preconfigured uplink time-frequency resource.

Figure 7:
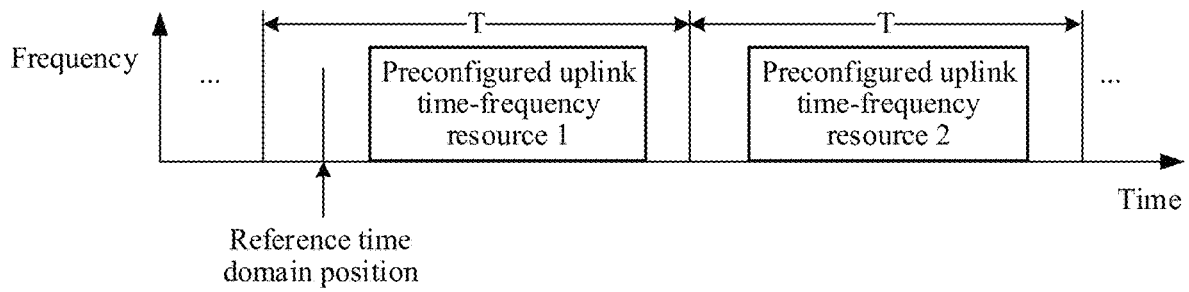
FIG. 7 is a schematic diagram 1 of a reference time domain position according to an embodiment of this application.

For example, as shown in FIG. 7, assuming that the preconfigured uplink time-frequency resource is an uplink time-frequency resource 1, the reference time domain position may be a position between a start time domain position of the preconfigured uplink time-frequency resource 1 and a start position of a periodicity of the preconfigured uplink time-frequency resource 1 in the periodicity of the preconfigured uplink time-frequency resource 1.

Figure 8:
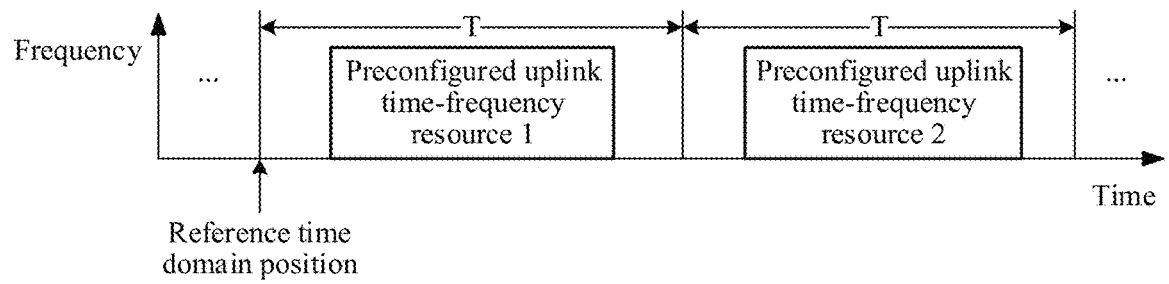
FIG. 8 is a schematic diagram 2 of a reference time domain position according to an embodiment of this application.

In some embodiments, for example, as shown in FIG. 8, assuming that the preconfigured uplink time-frequency resource is an uplink time-frequency resource 1, the reference time domain position may be a start position of the periodicity of the preconfigured uplink time-frequency resource.

Figure 9:
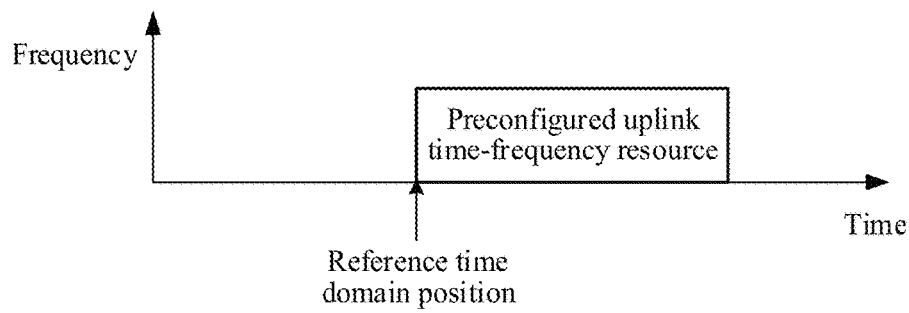
FIG. 9 is a schematic diagram 3 of a reference time domain position according to an embodiment of this application.

In some embodiments, in this embodiment of this application, the reference time domain position is a start time domain position of the preconfigured uplink time-frequency resource, as shown in FIG. 9.

In some embodiments, the preconfigured uplink time-frequency resource herein may be periodic, or may be aperiodic. This is not specifically limited herein.

For the foregoing two possible implementations:

In some embodiments, that the first terminal device determines a reference time domain position based on a preconfigured uplink time-frequency resource may include: receiving, by the first terminal device, first indication information from a network device, where the first indication information is used to indicate first offset duration of the reference time domain position relative to the start position of the periodicity of the preconfigured uplink time-frequency resource; and determining, by the first terminal device, the reference time domain position based on the first indication information and the start position of the periodicity of the preconfigured uplink time-frequency resource.

Figure 10:
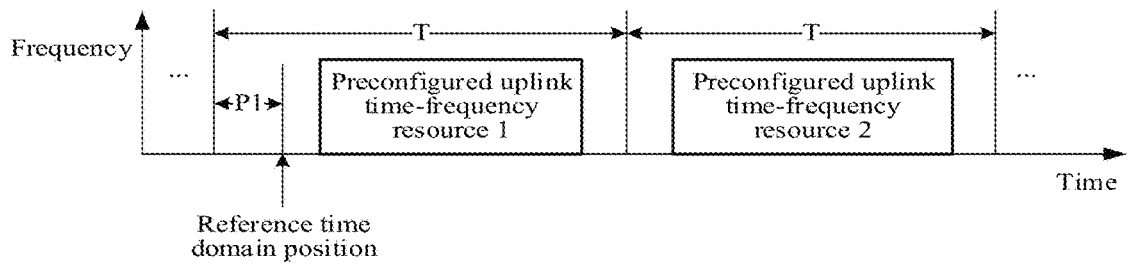
FIG. 10 is a schematic diagram of first offset duration according to an embodiment of this application.

For example, a description is provided with reference to FIG. 7. The first indication information may be used to indicate first offset duration P1 of the reference time domain position relative to the start position of the periodicity of the preconfigured uplink time-frequency resource 1. Further, the first terminal device may determine the reference time domain position based on the first indication information and the start position of the periodicity of the preconfigured uplink time-frequency resource 1, as shown in FIG. 10.

In some embodiments, that the first terminal device determines a reference time domain position based on a preconfigured uplink time-frequency resource may include: receiving, by the first terminal device, second indication information from the network device, where the second indication information is used to indicate second offset duration of the start time domain position of the preconfigured uplink time-frequency resource relative to the reference time domain position; and determining, by the first terminal device, the reference time domain position based on the second indication information and the start time domain position of the preconfigured uplink time-frequency resource.

Figure 11:
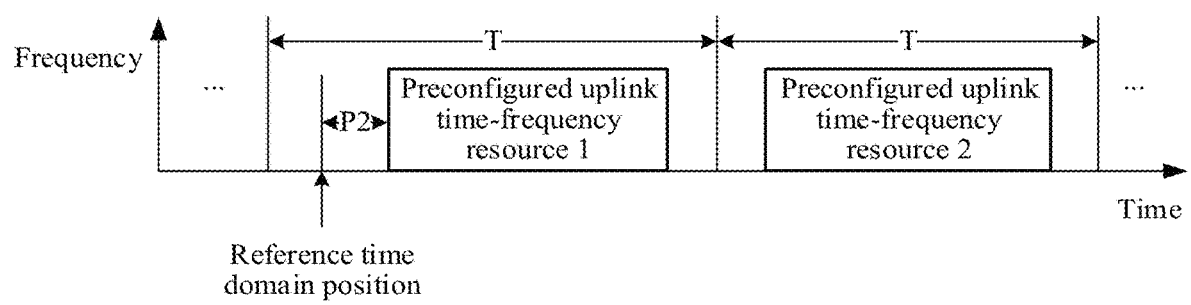
FIG. 11 is a schematic diagram of second offset duration according to an embodiment of this application.

For example, a description is provided with reference to FIG. 8. The second indication information may be used to indicate second offset duration P2 of the start time domain position of the preconfigured uplink time-frequency resource 1 relative to the reference time domain position. Further, the first terminal device may determine the reference time domain position based on the second indication information and a start time domain position of a preconfigured uplink time-frequency resource 2, as shown in FIG. 11.

In some embodiments, if the preconfigured uplink time-frequency resource is a periodic resource, every N preconfigured uplink resources may correspond to one reference time domain position. The reference time domain position is a time domain position before a start time domain position of the first preconfigured uplink time-frequency resource in a periodicity of the first preconfigured uplink time-frequency resource in the every N preconfigured uplink time-frequency resources. N is a positive integer greater than 1.

In some embodiments, the terminal device may determine the reference time domain position based on indication information sent by the network device. The indication information is used to indicate third offset duration of each reference time domain position relative to a start position of the periodicity of the first preconfigured uplink time-frequency resource in the every N preconfigured uplink time-frequency resources. In some embodiments, the indication information is used to indicate fourth offset duration of a start position of the first preconfigured uplink time-frequency resource in the every N preconfigured uplink time-frequency resources relative to each reference time domain position. For a related example, refer to FIG. 10 or FIG. 11. Details are not described herein again.

In some embodiments, if the preconfigured uplink time-frequency resource is a periodic resource, every N preconfigured uplink resources may correspond to one reference time domain position. The reference time domain position is a start position of the first preconfigured uplink time-frequency resource in the every N preconfigured uplink time-frequency resources. N is a positive integer greater than 1.

Figure 12:
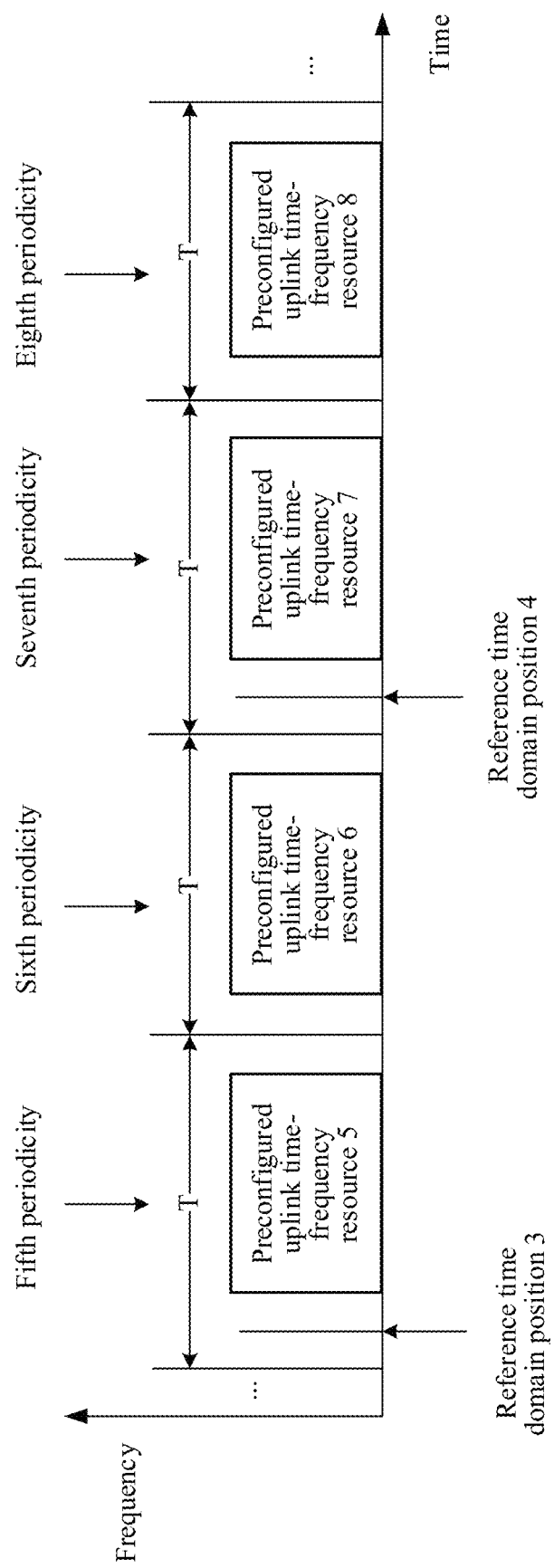
FIG. 12 is a schematic diagram 4 of a reference time domain position according to an embodiment of this application.

For example, it is assumed that N=2. To be specific, every two preconfigured uplink resources correspond to one reference time domain position. As shown in FIG. 12, it is assumed that a preconfigured uplink time-frequency resource 5 is in the fifth periodicity, a preconfigured uplink time-frequency resource 6 is in the sixth periodicity, a preconfigured uplink time-frequency resource 7 is in the seventh periodicity, and a preconfigured uplink time-frequency resource 8 is in the eighth periodicity. The preconfigured uplink time-frequency resource 5 and the preconfigured uplink time-frequency resource 6 may correspond to a reference time domain position 3, and the preconfigured uplink time-frequency resource 7 and the preconfigured uplink time-frequency resource 8 may correspond to a reference time domain position 4. That is, assuming that the preconfigured uplink time-frequency resource in operation S601 is the preconfigured uplink time-frequency resource 8 shown in FIG. 12, a reference time domain position determined based on the preconfigured uplink time-frequency resource 8 should be the reference time domain position 4 shown in FIG. 12, namely, a time domain position before a start time domain position of the preconfigured uplink time-frequency resource 7 in the periodicity of the preconfigured uplink time-frequency resource 7. In some embodiments, assuming that the preconfigured uplink time-frequency resource in operation S601 is the preconfigured uplink time-frequency resource 5 shown in FIG. 12, a reference time domain position determined based on the preconfigured uplink time-frequency resource 5 should be the reference time domain position 3 shown in FIG. 12, namely, a time domain position before a start time domain position of the preconfigured uplink time-frequency resource 5 in the periodicity of the preconfigured uplink time-frequency resource 5.

It should be noted that, a reference time domain position shown in FIG. 12 is a position between a start time domain position of the first preconfigured uplink time-frequency resource in every N preconfigured uplink time-frequency resources and a start position of a periodicity of the first preconfigured uplink time-frequency resource in the periodicity of the first preconfigured uplink time-frequency resource. In some embodiments, the reference time domain position may be the start position of the periodicity of the first preconfigured uplink time-frequency resource in the every N preconfigured uplink time-frequency resources. In some embodiments, the reference time domain position may be a start position of the first preconfigured uplink time-frequency resource in the every N preconfigured uplink time-frequency resources. Figures are not drawn one by one herein again.

In some embodiments, in this embodiment of this application, the start position of the periodicity of the preconfigured uplink time-frequency resource satisfies: (Subframe number corresponding to the start position) mod (Periodicity of the preconfigured uplink time-frequency resource/First specified value)=0; or (Frame number corresponding to the start position) mod (Periodicity of the preconfigured uplink time-frequency resource/Second specified value)=0, where mod( ) represents modulo, and the first specified value or the second specified value is a positive number.

If calculation is performed by using the subframe number corresponding to the start position of the periodicity of the preconfigured uplink time-frequency resource, for example, if a unit of the periodicity of the preconfigured uplink time-frequency resource is millisecond (ms), the first specified value herein may be 1. In some embodiments, if a unit of the periodicity of the preconfigured uplink time-frequency resource is (10 ms), the first specified value herein may be 10.

In some embodiments, if calculation is performed by using the frame number corresponding to the start position of the periodicity of the preconfigured uplink time-frequency resource, for example, if a unit of the periodicity of the preconfigured uplink time-frequency resource is ms, the second specified value herein may be 10. In some embodiments, if a unit of the periodicity of the preconfigured uplink time-frequency resource is 10 ms, the second specified value herein may be 1.

Figure 13:
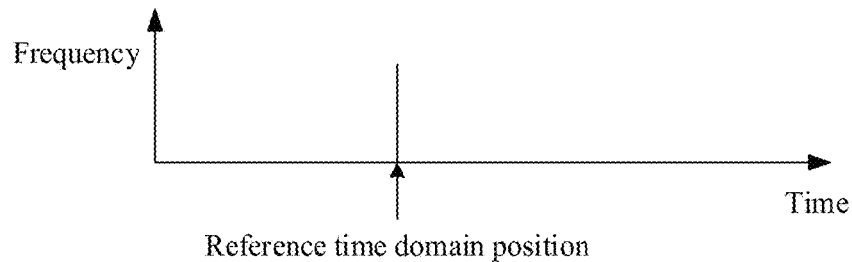
FIG. 13 is a schematic diagram 5 of a reference time domain position according to an embodiment of this application.

In some embodiments, the reference time domain position may not be related to the preconfigured uplink time-frequency resource. That is, the first terminal device may directly determine the reference time domain position. For example, as shown in FIG. 13, the reference time domain position may be an absolute time domain position. The absolute time domain position may be configured by the network device for the terminal device, or may be preconfigured on the terminal device in advance or specified in a protocol. This is not specifically limited in this embodiment of this application.

The reference time domain position is used to initialize a first sequence. For example, the first sequence may be a Gold sequence c(n). The Gold sequence c(n) is initialized at the reference time domain position. An initialization seed is $C_{init}=35$. Because the reference time domain positions of the plurality of terminal devices that transmit the uplink data on the same uplink time-frequency resource are the same, first sequences obtained through initialization performed by different terminal devices at a same reference time domain position are also the same. In other words, the different terminal devices correspond to a same first sequence on the same time-frequency resource.

Figure 14:
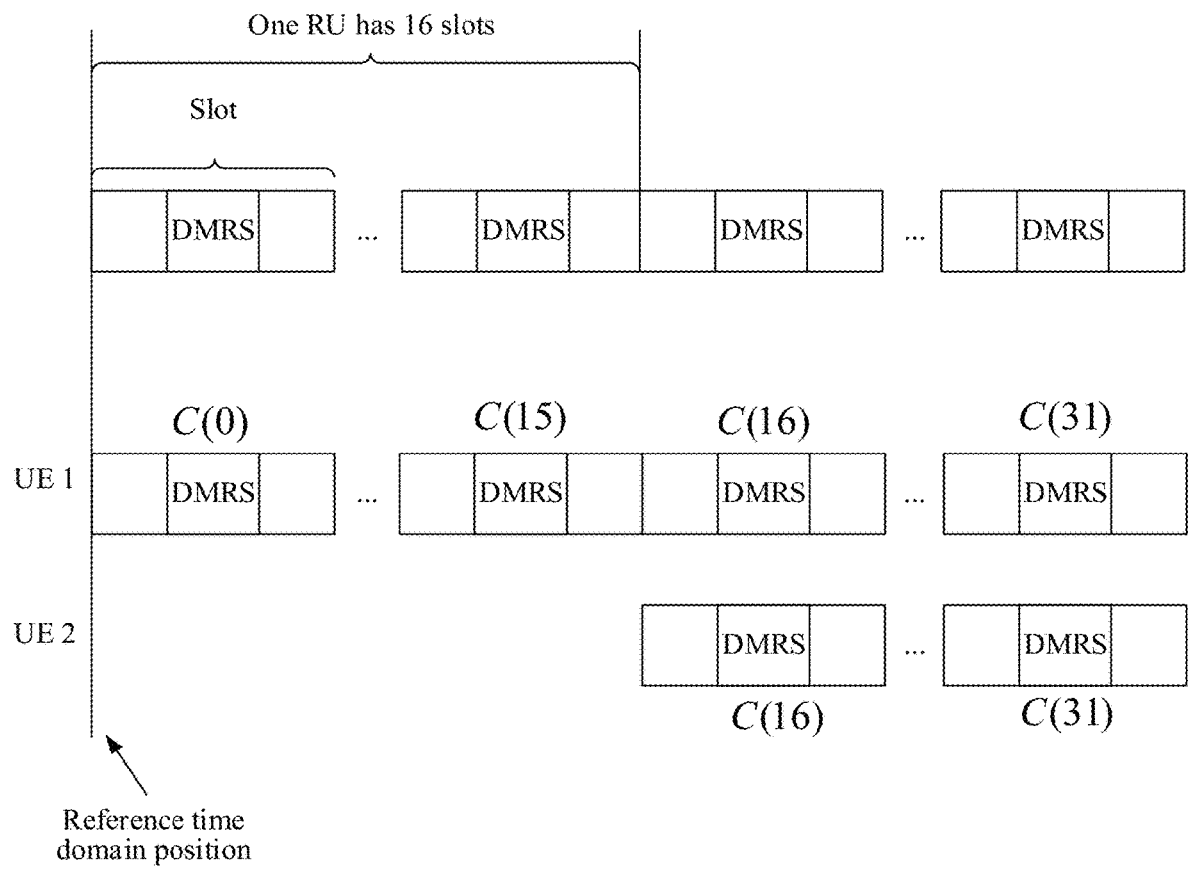
FIG. 14 is a schematic diagram of same Gold sequences according to an embodiment of this application.

For example, an example in which the first sequence is a Gold sequence c(n) is used for description. As shown in FIG. 14, it is assumed that two terminal devices (UE 1 and UE 2) send uplink data to the network device on a same preconfigured uplink time-frequency resource. The UE 1 starts sending uplink data at a start time domain position of the preconfigured uplink time-frequency resource (namely, a $0^{th}$ slot position of the preconfigured uplink time-frequency resource). The UE 2 may start sending uplink data at a $16^{th}$ slot position of the preconfigured uplink time-frequency resource. At the $16^{th}$ slot position, Gold sequences c(n) corresponding to the UE 1 and the UE 2 are both c(16). At a $31^{st}$ slot position, Gold sequences c(n) corresponding to the UE 1 and the UE 2 are both c(31).

S602: The first terminal device generates a first reference signal based on the first sequence and a time interval.

The time interval is an interval between the reference time domain position and a start time domain position of transmission of the first reference signal. The time interval may refer to a quantity of slots. For example, assuming that the reference time domain position is a $4^{th}$ slot, and the start time domain position of the transmission of the first reference signal is a $12^{th}$ slot, the time interval is 12−4=8. Particularly, when the start time domain position of the transmission of the first reference signal is the same as the reference time domain position, the time interval is 0.

In some embodiments, the first terminal device generates, based on the first sequence and the time interval, the first reference signal whose length is transmission duration of the first reference signal.

Figure 15:
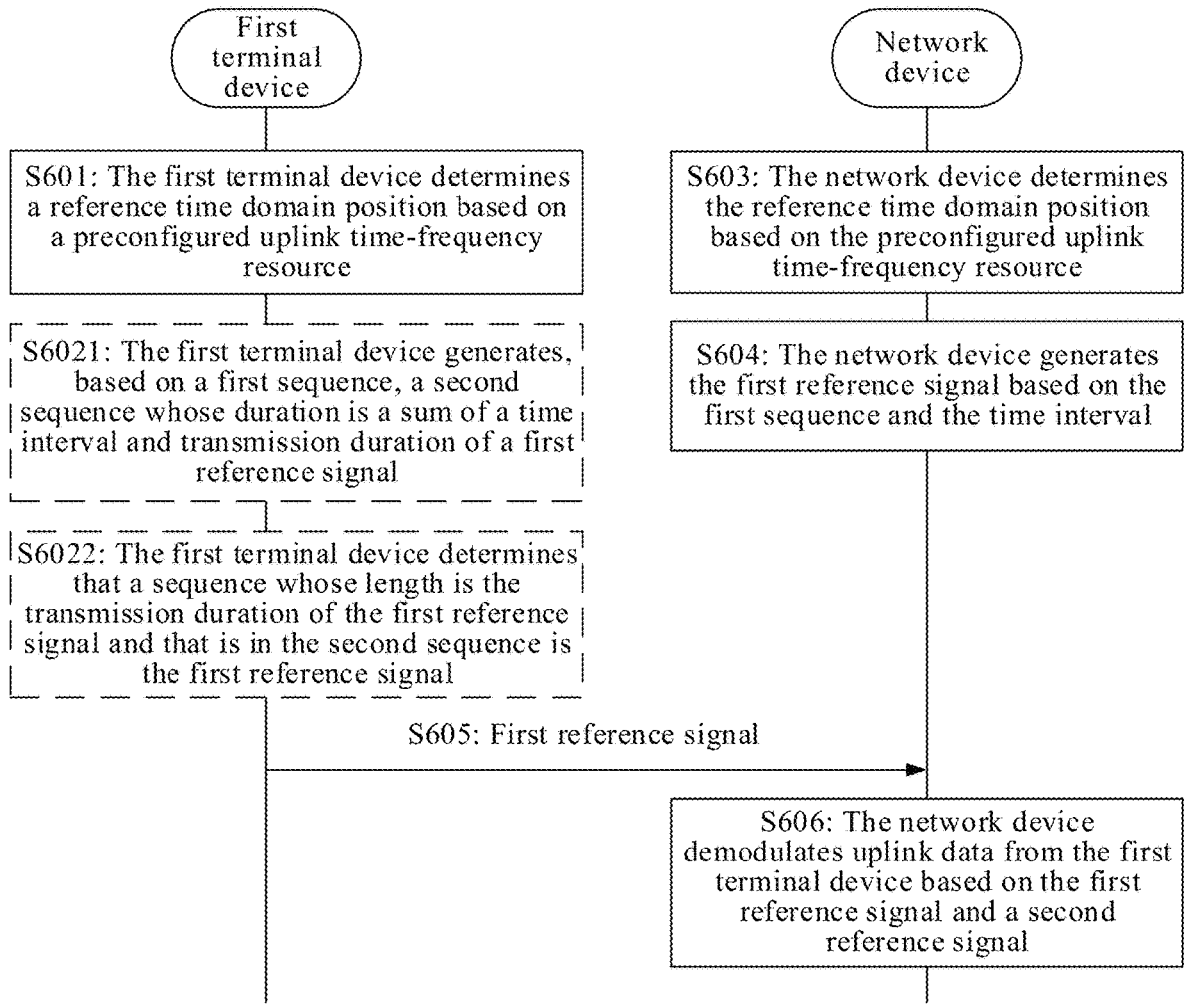
FIG. 15 shows a communication method 2 according to an embodiment of this application.
Figure 16:
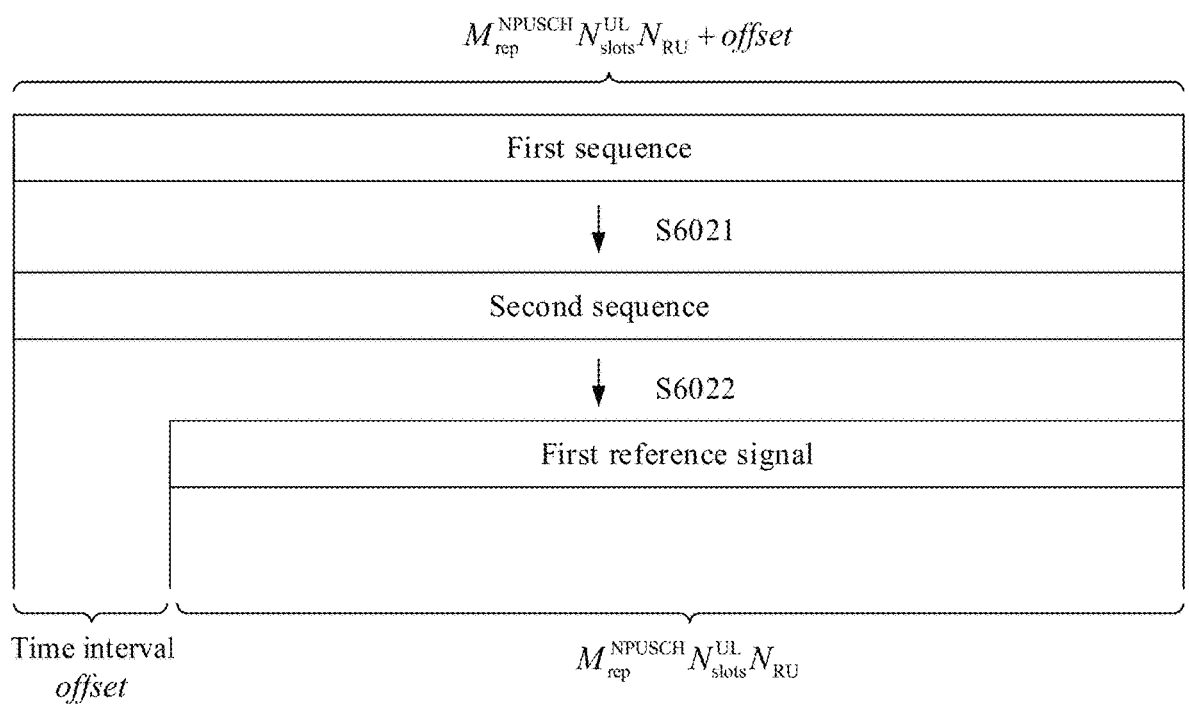
FIG. 16 is a schematic diagram 1 of generating a first reference signal based on a first sequence according to an embodiment of this application.

In some embodiments, as shown in FIG. 15, operation S602 may include operations S6021 and S6022. As shown in FIG. 16, in operation S6021, the first terminal device generates, based on the first sequence c(n), a second sequence X(n) whose length is $M_{rep}^{NPUSCH}N_{slots}^{UL}N_{RU}+$offset. In operation S6022, the first terminal device selects, as the first reference signal $r_u$ (n) from the second sequence X(n) a sequence whose length is $M_{rep}^{NPUSCH}N_{slots}^{UL}N_{RU}$ after a position of the time interval offset.

S6021: The first terminal device generates, based on the first sequence, the second sequence whose duration is a sum of the time interval and the transmission duration of the first reference signal.

According to the formula (1), a value range of n may be increased to $0 \leq n < M_{rep}^{NPUSCH}N_{slots}^{UL}N_{RU}+$offset, where $M_{rep}^{NPUSCH}N_{slots}^{UL}N_{RU}$ is the transmission duration of the first reference signal, and offset is the time interval. That is, the time interval, the transmission duration of the first reference signal, and the second sequence satisfy the following formula:

$$X(n) = \frac{1}{\sqrt{2}}(1+j)(1-2c(n))w(n \bmod 16), \quad \text{formula (10)}$$

$$0 \leq n < M_{rep}^{NPUSCH}N_{slots}^{UL}N_{RU} + \text{offset}$$

X(n) is the second sequence, the second sequence may be a DMRS sequence, offset is the time interval, $M_{rep}^{NPUSCH}N_{slots}^{UL}N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, c(n) is a Gold sequence, and w(n) is a Hadamard sequence.

S6022: The first terminal device determines that a sequence whose length is the transmission duration of the first reference signal and that is in the second sequence is the first reference signal.

A distance between the first value of the first reference signal and the first value of the second sequence is the time interval.

The first terminal device selects, as the first reference signal from the second sequence, a sequence whose length is $M_{rep}^{NPUSCH}N_{slots}^{UL}N_{RU}$ after a position of the time interval offset. That is, the first reference signal is $r_u$(n), where $r_u$(n−offset)=X(n), and a value range of n satisfies: offset$\leq n < M_{rep}^{NPUSCH}N_{slots}^{UL}N_{RU}+$offset.

With reference to operations S6021 and S6022, the first sequence is a Gold sequence, and it is finally learned that, the first sequence, the time interval, the transmission duration of the first reference signal, and the first reference signal satisfy the following formula:

$$r_u(n-\text{offset}) = \frac{1}{\sqrt{2}}(1+j)(1-2c(n))w(n \bmod 16), \quad \text{formula (11)}$$

$$\text{offset} \leq n < M_{rep}^{NPUSCH}N_{slots}^{UL}N_{RU} + \text{offset}$$

$r_u$ (n) is the first reference signal, offset is the time interval, $M_{rep}^{NPUSCH}N_{slots}^{UL}N_{RU}$ is the transmission duration of the first reference signal, $M_{rep}^{NPUSCH}$ is the quantity of repetitions of the transmission of the narrowband physical uplink shared channel, $N_{slots}^{UL}$ is the quantity of slots occupied by one resource unit, $N_{RU}$ is the quantity of resource units occupied by one data block, c(n) is a Gold sequence, and w(n) is a Hadamard sequence.

With reference to related discussions in FIG. 5 and FIG. 16, in this implementation, because different terminal devices all initialize Gold sequences c(n) at reference time domain positions, the Gold sequences c(n) corresponding to the different terminal devices are the same on a same time-frequency resource. Based on this, after a linear operation is performed on the Gold sequence c(n) and orthogonal Hadamard sequences w(n) corresponding to the different terminal devices, DMRS sequences corresponding to the different terminal devices are orthogonal on the same time-frequency resource.

Figure 17:
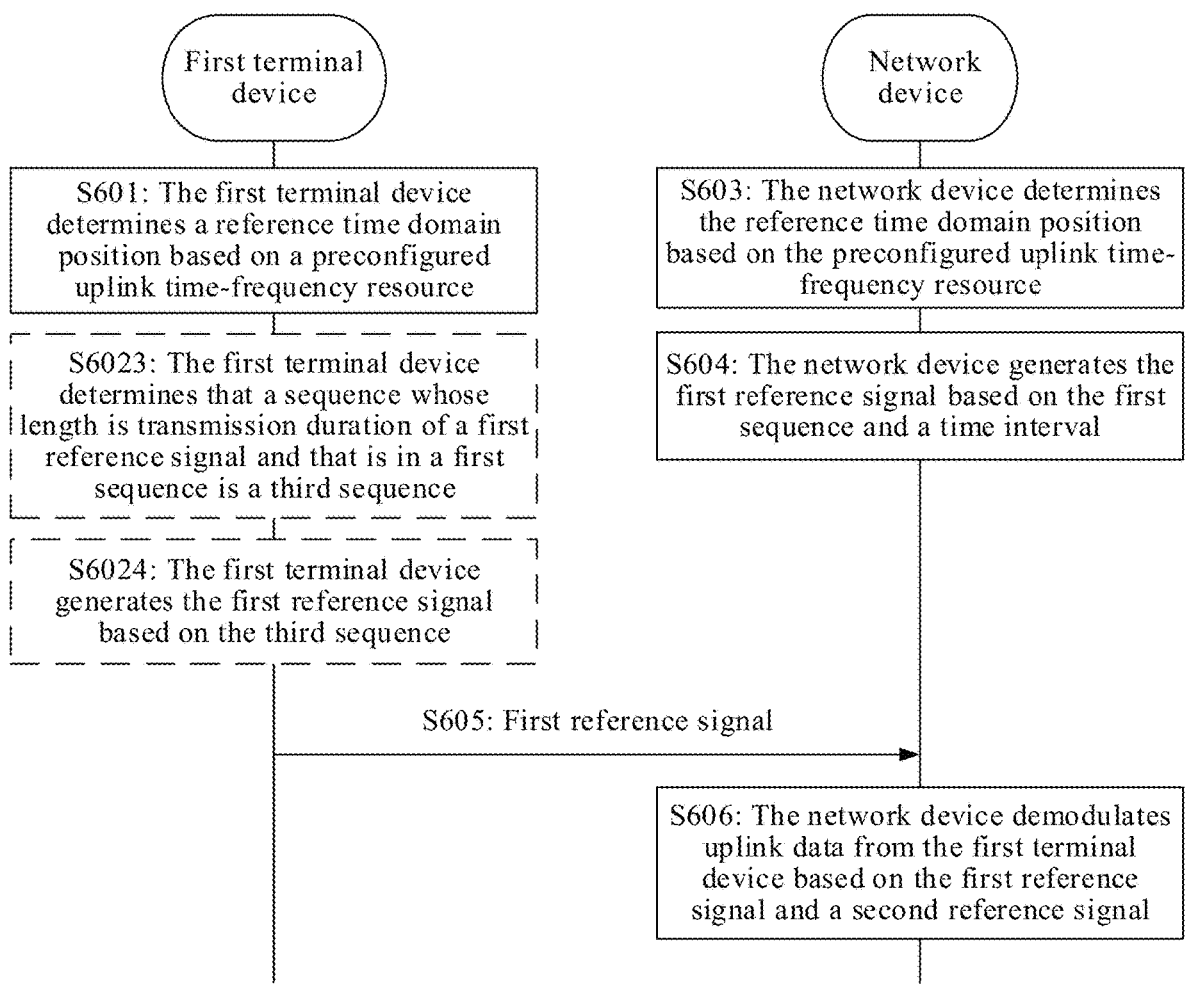
FIG. 17 shows a communication method 3 according to an embodiment of this application.
Figure 18:
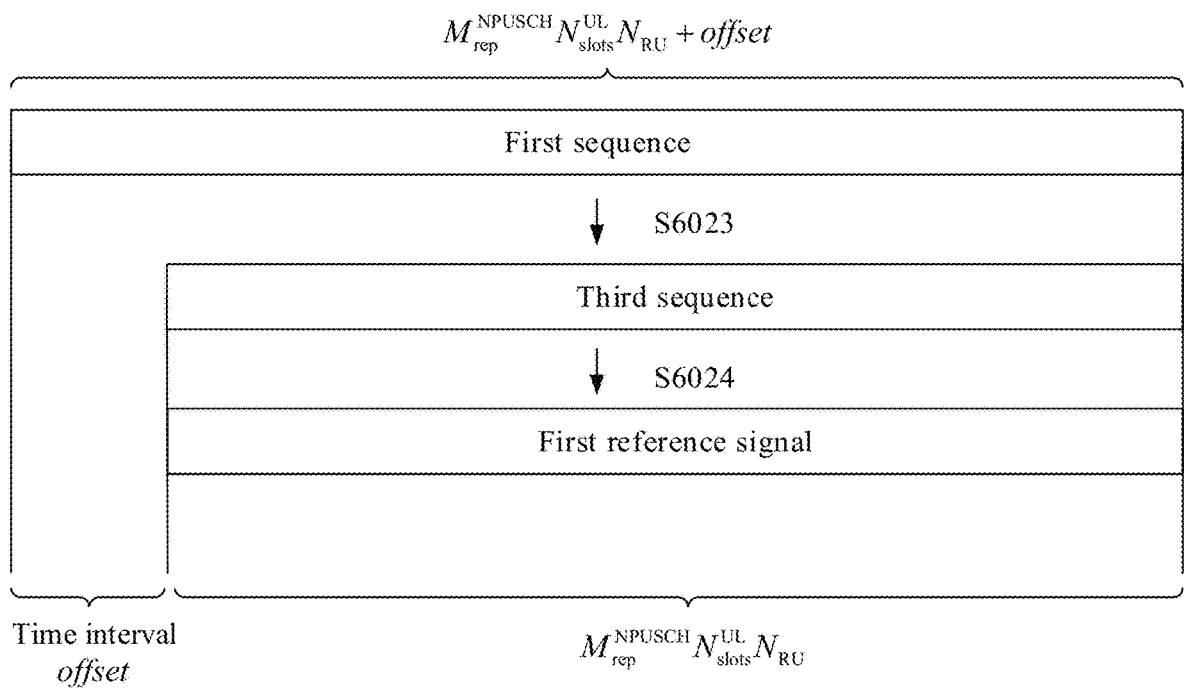
FIG. 18 is a schematic diagram 2 of generating a first reference signal based on a first sequence according to an embodiment of this application.

In some embodiments, as shown in FIG. 17, operation S602 may include S6023 and S6024. As shown in FIG. 18, in operation S6023, a length of the first sequence c(n) is $M_{rep}^{NPUSCH}N_{slots}^{UL}N_{RU}$+offset, and the first terminal device determines that a sequence whose length is $M_{rep}^{NPUSCH}N_{slots}^{UL}N_{RU}$ after a position of the time interval offset and that is in the first sequence c(n) is a third sequence c(n+offset); in operation S6024, the first terminal device generates the first reference signal $r_u$ (n) based on the third sequence c(n+offset).

S6023: The first terminal device determines that the sequence whose length is the transmission duration of the first reference signal and that is in the first sequence is the third sequence.

A distance between the first value of the third sequence and the first value of the first sequence is the time interval. The length of the first sequence is a sum of the time interval and the transmission duration of the first reference signal.

The first sequence is a Gold sequence c(n), where a value range of n satisfies $0 \le n < M_{rep}^{NPUSCH}N_{slots}^{UL}N_{RU}$+offset, offset is the time interval, $M_{rep}^{NPUSCH}N_{slots}^{UL}N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, and $N_{RU}$ is a quantity of resource units occupied by one data block.

In this case, the third sequence is c(n+offset), where a value range of n satisfies $0 \le n < M_{rep}^{NPUSCH}N_{slots}^{UL}N_{RU}$.

S6024: The first terminal device generates the first reference signal based on the third sequence.

The time interval, the transmission duration of the first reference signal, the third sequence, and the first reference signal satisfy the following formula:

$$r_u(n) = \frac{1}{\sqrt{2}}(1+j)(1-2c(n+\text{offset}))w(n \bmod 16), \quad \text{formula (12)}$$

$$0 \le n < M_{rep}^{NPUSCH}N_{slots}^{UL}N_{RU}$$

$r_u$ (n) is the first reference signal, c(n+offset) is the third sequence, offset is the time interval, $M_{rep}^{NPUSCH}N_{slots}^{UL}N_{RU}$ is the transmission duration of the first reference signal, $M_{rep}^{NPUSCH}$ is the quantity of repetitions of the transmission of the narrowband physical uplink shared channel, $N_{slots}^{UL}$ is the quantity of slots occupied by one resource unit, and $N_{RU}$ is the quantity of resource units occupied by one data block.

With reference to operations S6023 and S6024, the first sequence is a Gold sequence, and it is finally learned that, the first sequence, the time interval, the transmission duration of the first reference signal, and the first reference signal satisfy the following formula:

$$r_u(n) = \frac{1}{\sqrt{2}}(1+j)(1-2c(n+\text{offset}))w(n \bmod 16), \quad \text{formula (13)}$$

$$0 \le n < M_{rep}^{NPUSCH}N_{slots}^{UL}N_{RU}$$

$r_u$ (n) is the first reference signal, offset is the time interval, $M_{rep}^{NPUSCH}N_{slots}^{UL}N_{RU}$ is the transmission duration of the first reference signal, $M_{rep}^{NPUSCH}$ is the quantity of repetitions of the transmission of the narrowband physical uplink shared channel, $N_{slots}^{UL}$ is the quantity of slots occupied by one resource unit, $N_{RU}$ is the quantity of resource units occupied by one data block, c(n) is a Gold sequence, and w(n) is a Hadamard sequence.

With reference to related discussions in FIG. 5 and FIG. 18, in this implementation, because different terminal devices all initialize Gold sequences c(n) at reference time domain positions, initial Gold sequences c(n) corresponding to the different terminal devices are the same on a same time-frequency resource. Based on this, the terminal device starts to select a Gold sequence at a position corresponding to the start time domain position of the transmission of the first reference signal, so that after the start time domain position, Gold sequences corresponding to the different terminal devices are the same on the same time-frequency resource. After a linear operation is performed on the Gold sequence and orthogonal Hadamard sequences w(n) corresponding to the different terminal devices, DMRS sequences corresponding to different terminal devices are orthogonal on the same time-frequency resource. Therefore, first reference signals of different terminal devices on a same time-frequency resource of a preconfigured uplink time-frequency resource are still orthogonal.

S603: The network device determines the reference time domain position based on the preconfigured uplink time-frequency resource.

The reference time domain position is the same as the reference time domain position determined by the another terminal device in the plurality of terminal devices. The reference time domain position is used to initialize the first sequence.

Similar to operation S601, in some embodiments, the reference time domain position may not be related to the preconfigured uplink time-frequency resource. That is, the network device may directly determine the reference time domain position. For example, as shown in FIG. 13, the reference time domain position may be an absolute time domain position. The absolute time domain position may be determined by the network device, or may be preconfigured on the network device in advance or specified in a protocol. This is not specifically limited in this embodiment of this application.

S604: The network device generates the first reference signal based on the first sequence and the time interval.

The time interval is the interval between the reference time domain position and the start time domain position of the transmission of the first reference signal.

For related descriptions of operations S603 and S604, refer to operations S601 and S602. Details are not described herein again.

S605: The first terminal device sends the first reference signal to the network device.

Correspondingly, the network device receives a second reference signal from the first terminal device.

It should be noted that, in a process in which the first reference signal sent by the first terminal device is transmitted on a spatial channel, the first reference signal is affected by interference or the like. The network device finally receives the second reference signal from the first terminal device, where the second reference signal is the first reference signal affected by spatial interference.

In some embodiments, the first terminal device may send the first reference signal to the network device on the preconfigured uplink time-frequency resource. The preconfigured uplink time-frequency resource may be a dedicated resource (dedicated resource), or may be a shared resource (shared resource), or may include a part of dedicated resources (dedicated resource) and a part of shared resources (shared resource). This is not specifically limited herein.

The first reference signal may be carried in an uplink data frame (for example, a PUSCH), and the uplink data frame includes uplink data.

S606: The network device demodulates the uplink data from the first terminal device based on the first reference signal and the second reference signal.

In some embodiments, the network device performs channel estimation and channel equalization based on the first reference signal and the second reference signal, and demodulates the uplink data from the first terminal device based on an estimated and equalized channel, that is, demodulates the uplink data in the uplink data frame received in operation S605.

In this embodiment of this application, there is no necessary execution sequence between operations S601 and S602 and operations S603 and S604. Operations S601 and S602 may be performed first, and then operations S603 and S604 are performed. In some embodiments, operations S603 and S604 may be performed first, and then operations S601 and S602 are performed. In some embodiments, operations S601 and S602 and operations S603 and S604 may be performed simultaneously. This is not specifically limited in this embodiment of this application.

According to the communication method provided in this embodiment of this application, the first terminal device and the network device determine the reference time domain position based on the preconfigured uplink time-frequency resource. The reference time domain position is the same as the reference time domain position determined by the another terminal device in the plurality of terminal devices. The reference time domain position is used to initialize the first sequence. The first terminal device and the network device generate the first reference signal based on the first sequence and the time interval. The time interval is the interval between the reference time domain position and the start time domain position of the transmission of the first reference signal. The first terminal device sends the first reference signal to the network device. The network device receives the second reference signal from the first terminal device. The network device demodulates the uplink data from the first terminal device based on the first reference signal and the second reference signal. Because the first sequence is initialized at the reference time domain position, different terminal devices correspond to a same first sequence on a same time-frequency resource. The first reference signal is generated based on the first sequence and the foregoing time interval. The foregoing time interval enables the different terminal devices to correspond, starting from the start time domain position of the transmission of the first reference signal, to the same first sequence on the same time-frequency resource. After first reference signals are obtained by performing a linear operation on the first sequence and orthogonal Hadamard sequences, it is ensured that, the first reference signals corresponding to the different terminal devices are always orthogonal on the same time-frequency resource. Therefore, even if uplink data needs to be transmitted after a start position of the preconfigured uplink time-frequency resource, the uplink data can still be sent on the preconfigured uplink time-frequency resource, so that the terminal device can transmit the uplink data before a start position of a next preconfigured uplink time-frequency resource when the terminal device needs to transmit the uplink data after the start position of the preconfigured uplink time-frequency resource.

It may be understood that, in the foregoing embodiments, methods and/or operations implemented by the first terminal device may be implemented by a component (for example, a chip or a circuit) that can be used in the first terminal device, and methods and/or operations implemented by the network device may be implemented by a component that can be used in the network device.

The foregoing mainly describes the solutions provided in the embodiments of this application from a perspective of interaction between the network elements. Correspondingly, the embodiments of this application provide a communication apparatus. The communication apparatus is configured to implement the foregoing methods. The communication apparatus may be the first terminal device in the foregoing method embodiments, or an apparatus including the foregoing first terminal device, or a component that can be used in the first terminal device. In some embodiments, the communication apparatus may be the network device in the foregoing method embodiments, or an apparatus including the foregoing network device, or a component that can be used in the network device. It can be understood that, to implement the foregoing functions, the communication apparatus includes a corresponding hardware structure and/or software module for performing the functions. A person skilled in the art should be easily aware that, in combination with units and algorithm operations of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software function module. It should be noted that, in the embodiments of this application, division into the modules is an example, and is merely logical function division. During actual implementation, another division manner may be used.

Figure 19:
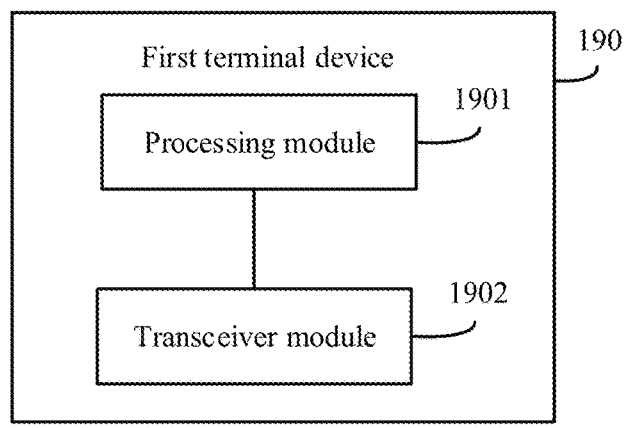
FIG. 19 is a schematic structural diagram of a first terminal device according to an embodiment of this application.

For example, the communication apparatus is the first terminal device in the foregoing method embodiments. FIG. 19 is a schematic structural diagram of a first terminal device 190. The first terminal device 190 includes a processing module 1901 and a transceiver module 1902. The transceiver module 1902 may also be referred to as a transceiver unit, and is configured to implement a sending and/or receiving function, for example, may be a transceiver circuit, a transceiver, a transceiver, or a communication interface.

The processing module 1901 is configured to determine a reference time domain position, where the reference time domain position is the same as a reference time domain position determined by another terminal device in the plurality of terminal devices, and the reference time domain position is used to initialize a first sequence.

The processing module 1901 is configured to generate a first reference signal based on the first sequence and a time interval, where the time interval is an interval between the reference time domain position and a start time domain position of transmission of the first reference signal.

The transceiver module 1902 is configured to send the first reference signal to a network device.

The following provides more details.

The processing module 1901 is configured to determine a reference time domain position based on a preconfigured uplink time-frequency resource, where the reference time domain position is the same as a reference time domain position determined by another terminal device in the plurality of terminal devices, and the reference time domain position is used to initialize a first sequence.

The processing module 1901 is configured to generate a first reference signal based on the first sequence and a time interval, where the time interval is an interval between the reference time domain position and a start time domain position of transmission of the first reference signal.

The transceiver module 1902 is configured to send the first reference signal to a network device.

In some embodiments, the reference time domain position is a time domain position before a start time domain position of the preconfigured uplink time-frequency resource in a periodicity of the preconfigured uplink time-frequency resource.

In some embodiments, the reference time domain position is a start position of the periodicity of the preconfigured uplink time-frequency resource.

In some embodiments, the start position of the periodicity of the preconfigured uplink time-frequency resource satisfies: (Subframe number corresponding to the start position) mod (Periodicity of the preconfigured uplink time-frequency resource/First specified value)=0; or (Frame number corresponding to the start position) mod (Periodicity of the preconfigured uplink time-frequency resource/Second specified value)=0, where mod( ) represents modulo, and the first specified value or the second specified value is a positive number.

In some embodiments, the reference time domain position is a start time domain position of the preconfigured uplink time-frequency resource.

In some embodiments, that the processing module 1901 is configured to determine a reference time domain position based on a preconfigured uplink time-frequency resource includes: the transceiver module 1902 is configured to receive first indication information from the network device, where the first indication information is used to indicate first offset duration of the reference time domain position relative to the start position of the periodicity of the preconfigured uplink time-frequency resource; and the processing module 1901 is configured to determine the reference time domain position based on the first indication information and the start position of the periodicity of the preconfigured uplink time-frequency resource.

In some embodiments, that the processing module 1901 is configured to determine a reference time domain position based on a preconfigured uplink time-frequency resource includes: the transceiver module 1902 is configured to receive second indication information from the network device, where the second indication information is used to indicate second offset duration of the start time domain position of the preconfigured uplink time-frequency resource relative to the reference time domain position; and the processing module 1901 is configured to determine the reference time domain position based on the second indication information and the start time domain position of the preconfigured uplink time-frequency resource.

In some embodiments, that the processing module 1901 is configured to generate a first reference signal based on the first sequence and a time interval includes: the processing module 1901 is configured to generate, based on the first sequence and the time interval, the first reference signal whose length is transmission duration of the first reference signal.

In some embodiments, the first sequence is a Gold sequence, and the first sequence, the time interval, the transmission duration of the first reference signal, and the first reference signal satisfy the following formula:

$$r_u(n - \text{offset}) = \frac{1}{\sqrt{2}}(1 + j)(1 - 2c(n))w(n \bmod 16),$$

$$\text{offset} \le n < M_{rep}^{NPUSCH} N_{slots}^{UL} N_{RU} + \text{offset},$$

where $r_u(n)$ is the first reference signal, offset is the time interval $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, $c(n)$ is a Gold sequence, and $w(n)$ is a Hadamard sequence.

In some embodiments, that the processing module 1901 is configured to generate a first reference signal based on the first sequence and a time interval includes: the processing module 1901 is configured to generate, based on the first sequence, a second sequence whose duration is a sum of the time interval and transmission duration of the first reference signal; and the processing module 1901 is configured to determine that a sequence whose length is the transmission duration of the first reference signal and that is in the second sequence is the first reference signal, where a distance between the first value of the first reference signal and the first value of the second sequence is the time interval.

In some embodiments, the first sequence is a Gold sequence, and the first sequence, the time interval, the transmission duration of the first reference signal, and the second sequence satisfy the following formula:

$$X(n) = \frac{1}{\sqrt{2}}(1 + j)(1 - 2c(n))w(n \bmod 16),$$

$$0 \le n < M_{rep}^{NPUSCH} N_{slots}^{UL} N_{RU} + \text{offset},$$

where $X(n)$ is the second sequence, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, c(n) is a Gold sequence, and w(n) is a Hadamard sequence.

In some embodiments, the first reference signal is $r_u$ (n), where $r_u$ (n−offset)=X (n), and a value range of n satisfies: offset≤n<$M_{rep}^{NPUSCH}N_{slots}^{UL}N_{RU}$+offset.

In some embodiments, the first sequence is a Gold sequence, and the first sequence, the time interval, the transmission duration of the first reference signal, and the first reference signal satisfy the following formula:

$$r_u(n) = \frac{1}{\sqrt{2}}(1+j)(1-2c(n+\text{offset}))w(n \bmod 16),$$

$$0 \le n < M_{rep}^{NPUSCH}N_{slots}^{UL}N_{RU},$$

where $r_u$ (n) is the first reference signal, offset is the time interval, $M_{rep}^{NPUSCH}N_{slots}^{UL}N_{RU}$ is the transmission duration of the reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, c(n) is a Gold sequence, and w(n) is a Hadamard sequence.

In some embodiments, a length of the first sequence is a sum of the time interval and transmission duration of the first reference signal. That the processing module 1901 is configured to generate a first reference signal based on the first sequence and a time interval includes: the processing module 1901 is configured to determine that a sequence whose length is the transmission duration of the first reference signal and that is in the first sequence is a third sequence, where a distance between the first value of the third sequence and the first value of the first sequence is the time interval; and the processing module 1901 is configured to generate the first reference signal based on the third sequence.

In some embodiments, the first sequence is a Gold sequence c(n), where a value range of satisfies 0≤n<$M_{rep}^{NPUSCH}N_{slots}^{UL}N_{RU}$+offset, offset is the time interval, $M_{rep}^{NPUSCH}N_{slots}^{UL}N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, and $N_{RU}$ is a quantity of resource units occupied by one data block.

In some embodiments, the time interval, the transmission duration of the first reference signal, the third sequence, and the first reference signal satisfy the following formula:

$$r_u(n) = \frac{1}{\sqrt{2}}(1+j)(1-2c(n+\text{offset}))w(n \bmod 16),$$

$$0 \le n < M_{rep}^{NPUSCH}N_{slots}^{UL}N_{RU},$$

where $r_u$ (n) is the first reference signal, c(n+offset) is the third sequence, offset is the time interval, $M_{rep}^{NPUSCH}N_{slots}^{UL}N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, and $N_{RU}$ is a quantity of resource units occupied by one data block.

All related content of the operations in the foregoing method embodiments may be cited in function descriptions of the corresponding functional modules. Details are not described herein again.

In this embodiment, the first terminal device 190 is presented in a form of functional modules obtained through division in an integrated manner. The "module" herein may be a specified ASIC, a circuit, a processor and a memory that execute one or more software or firmware programs, an integrated logic circuit, and/or another component that can provide the foregoing functions. In a simple embodiment, a person skilled in the art may figure out that the first terminal device 190 may be in a form of the terminal device 40 shown in FIG. 3.

For example, the processor 401 in the terminal device 40 shown in FIG. 3 may invoke the computer-executable instructions stored in the memory 402, to enable the terminal device 40 to perform the communication methods in the foregoing method embodiments.

In some embodiments, the processor 401 in the terminal device 40 shown in FIG. 3 may invoke the computer-executable instructions stored in the memory 402, to implement functions/implementation processes of the processing module 1901 and the transceiver module 1902 in FIG. 19. In some embodiments, the processor 401 in the terminal device 40 shown in FIG. 3 may invoke the computer-executable instructions stored in the memory 402, to implement functions/implementation processes of the processing module 1901 in FIG. 19, and the transceiver 403 in the terminal device 40 shown in FIG. 3 may implement functions/implementation processes of the transceiver module 1902 in FIG. 19.

The first terminal device 190 provided in this embodiment can perform the foregoing communication methods. Therefore, for a technical effect that can be achieved by the first terminal device 190, refer to the foregoing method embodiments. Details are not described herein again.

Figure 20:
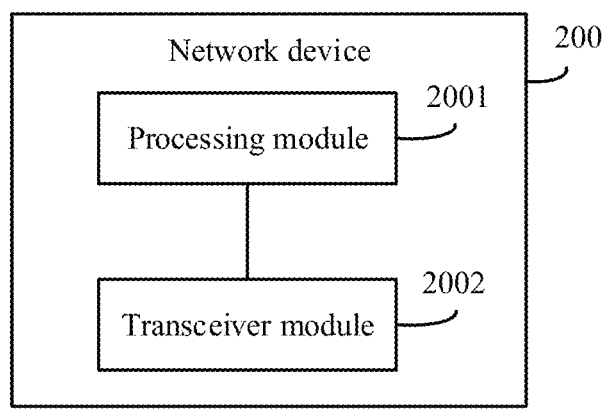
FIG. 20 is a schematic structural diagram of a network device according to an embodiment of this application.

In some embodiments, the communication apparatus is the network device in the foregoing method embodiments. FIG. 20 is a schematic structural diagram of a network device 200. The network device 200 includes a processing module 2001 and a transceiver module 2002. The transceiver module 2002 may also be referred to as a transceiver unit, and is configured to implement a sending and/or receiving function, for example, may be a transceiver circuit, a transceiver, a transceiver, or a communication interface.

The processing module 2001 is configured to determine a reference time domain position, where the reference time domain position is the same as a reference time domain position determined by another terminal device in the plurality of terminal devices, and the reference time domain position is used to initialize a first sequence.

The processing module 2001 is configured to generate a first reference signal based on the first sequence and a time interval, where the time interval is an interval between the reference time domain position and a start time domain position of transmission of the first reference signal.

The transceiver module 2002 is configured to receive a second reference signal from the first terminal device.

The processing module 2001 is configured to demodulate uplink data from the first terminal device based on the first reference signal and the second reference signal.

The following provides more details.

The processing module 2001 is configured to determine a reference time domain position based on a preconfigured uplink time-frequency resource, where the reference time domain position is the same as a reference time domain position determined by another terminal device in the plurality of terminal devices, and the reference time domain position is used to initialize a first sequence.

The processing module 2001 is configured to generate a first reference signal based on the first sequence and a time interval, where the time interval is an interval between the reference time domain position and a start time domain position of transmission of the first reference signal.

The transceiver module 2002 is configured to receive a second reference signal from the first terminal device.

The processing module 2001 is configured to demodulate uplink data from the first terminal device based on the first reference signal and the second reference signal.

In some embodiments, the reference time domain position is a time domain position before a start time domain position of the preconfigured uplink time-frequency resource in a periodicity of the preconfigured uplink time-frequency resource.

In some embodiments, the reference time domain position is a start position of the periodicity of the preconfigured uplink time-frequency resource.

In some embodiments, the start position of the periodicity of the preconfigured uplink time-frequency resource satisfies: (Subframe number corresponding to the start position) mod (Periodicity of the preconfigured uplink time-frequency resource/First specified value)=0; or (Frame number corresponding to the start position) mod (Periodicity of the preconfigured uplink time-frequency resource/Second specified value)=0, where mod( ) represents modulo, and the first specified value or the second specified value is a positive number.

In some embodiments, the reference time domain position is a start time domain position of the preconfigured uplink time-frequency resource.

In some embodiments, that the processing module 2001 is configured to determine a reference time domain position based on a preconfigured uplink time-frequency resource includes: the processing module 2001 is configured to determine first indication information, where the first indication information is used to indicate first offset duration of the reference time domain position relative to the start position of the periodicity of the preconfigured uplink time-frequency resource; and the processing module 2001 is configured to determine the reference time domain position based on the first indication information and the start position of the periodicity of the preconfigured uplink time-frequency resource.

In some embodiments, that the processing module 2001 is configured to determine a reference time domain position based on a preconfigured uplink time-frequency resource includes: the processing module 2001 is configured to determine second indication information, where the second indication information is used to indicate second offset duration of the start time domain position of the preconfigured uplink time-frequency resource relative to the reference time domain position; and the processing module 2001 is configured to determine the reference time domain position based on the second indication information and the start time domain position of the preconfigured uplink time-frequency resource.

In some embodiments, that the processing module 2001 is configured to generate a first reference signal based on the first sequence and a time interval includes: the processing module 2001 is configured to generate, based on the first sequence and the time interval, the first reference signal whose length is transmission duration of the first reference signal.

In some embodiments, the first sequence is a Gold sequence, and the first sequence, the time interval, the transmission duration of the first reference signal, and the first reference signal satisfy the following formula:

$$r_u(n - \text{offset}) = \frac{1}{\sqrt{2}}(1 + j)(1 - 2c(n))w(n \bmod 16),$$

$$\text{offset} \le n < M_{rep}^{NPUSCH} N_{slots}^{UL} N_{RU} + \text{offset},$$

where $r_u(n)$ is the first reference signal, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, $c(n)$ is a Gold sequence, and $w(n)$ is a Hadamard sequence.

In some embodiments, that the processing module 2001 is configured to generate a first reference signal based on the first sequence and a time interval includes: the processing module 2001 is configured to generate, based on the first sequence, a second sequence whose duration is a sum of the time interval and transmission duration of the first reference signal; and the processing module 2001 is configured to determine that a sequence whose length is the transmission duration of the first reference signal and that is in the second sequence is the first reference signal, where a distance between the first value of the first reference signal and the first value of the second sequence is the time interval.

In some embodiments, the first sequence is a Gold sequence, and the first sequence, the time interval, the transmission duration of the first reference signal, and the second sequence satisfy the following formula:

$$X(n) = \frac{1}{\sqrt{2}}(1 + j)(1 - 2c(n))w(n \bmod 16),$$

$$0 \le n < M_{rep}^{NPUSCH} N_{slots}^{UL} N_{RU} + \text{offset},$$

where $X(n)$ is the second sequence, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, $c(n)$ is a Gold sequence, and $w(n)$ is a Hadamard sequence.

In some embodiments, the first reference signal is $r_u(n)$ where $r_u(n-\text{offset})=X(n)$, and a value range of n satisfies: offset≤n<$M_{rep}^{NPUSCH} N_{slots}^{UL} N_{RU}$+offset.

In some embodiments, the first sequence is a Gold sequence, and the first sequence, the time interval, the transmission duration of the first reference signal, and the first reference signal satisfy the following formula:

$$r_u(n) = \frac{1}{\sqrt{2}}(1 + j)(1 - 2c(n + \text{offset}))w(n \bmod 16),$$

$$0 \le n < M_{rep}^{NPUSCH} N_{slots}^{UL} N_{RU},$$

where $r_u(n)$ is the first reference signal, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, $N_{RU}$ is a quantity of resource units occupied by one data block, c(n) is a Gold sequence, and w(n) is a Hadamard sequence.

In some embodiments, a length of the first sequence is a sum of the time interval and transmission duration of the first reference signal. That the processing module 2001 is configured to generate a first reference signal based on the first sequence and a time interval includes: the processing module 2001 is configured to determine that a sequence whose length is the transmission duration of the first reference signal and that is in the first sequence is a third sequence, where a distance between the first value of the third sequence and the first value of the first sequence is the time interval; and the processing module 2001 is configured to generate the first reference signal based on the third sequence.

In some embodiments, the first sequence is a Gold sequence c(n), where a value range of n satisfies $0 \leq n < M_{rep}^{NPUSCH} N_{slots}^{UL} N_{RU}$+offset, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, and $N_{RU}$ is a quantity of resource units occupied by one data block.

In some embodiments, the time interval, the transmission duration of the first reference signal, the third sequence, and the first reference signal satisfy the following formula:

$$r_u(n) = \frac{1}{\sqrt{2}}(1+j)(1-2c(n+\text{offset}))w(n \bmod 16),$$

$$0 \leq n < M_{rep}^{NPUSCH} N_{slots}^{UL} N_{RU},$$

where $r_u(n)$ is the first reference signal, c(n+offset) is the third sequence, offset is the time interval, $M_{rep}^{NPUSCH} N_{slots}^{UL} N_{RU}$ is the transmission duration of the first reference signal, $M_{rep}^{NPUSCH}$ is a quantity of repetitions of transmission of a narrowband physical uplink shared channel, $N_{slots}^{UL}$ is a quantity of slots occupied by one resource unit, and $N_{RU}$ is a quantity of resource units occupied by one data block.

All related content of the operations in the foregoing method embodiments may be cited in function descriptions of the corresponding functional modules. Details are not described herein again.

In this embodiment, the network device 200 is presented in a form of functional modules obtained through division in an integrated manner. The "module" herein may be a specified ASIC, a circuit, a processor and a memory that execute one or more software or firmware programs, an integrated logic circuit, and/or another component that can provide the foregoing functions. In a simple embodiment, a person skilled in the art may figure out that the network device 200 may be in a form of the network device 30 shown in FIG. 3.

For example, the processor 301 in the network device 30 shown in FIG. 3 may invoke computer-executable instructions stored in the memory 302, to enable the network device 30 to perform the communication methods in the foregoing method embodiments.

In some embodiments, the processor 301 in the network device 30 shown in FIG. 3 may invoke the computer-executable instructions stored in the memory 302, to implement functions/implementation processes of the processing module 2001 and the transceiver module 2002 in FIG. 20. In some embodiments, the processor 301 in the network device 30 shown in FIG. 3 may invoke the computer-executable instructions stored in the memory 302, to implement functions/implementation processes of the processing module 2001 in FIG. 20, and the transceiver 303 in the network device 30 shown in FIG. 3 may implement functions/implementation processes of the transceiver module 2002 in FIG. 20.

The network device 200 provided in this embodiment can perform the foregoing communication methods. Therefore, for a technical effect that can be achieved by the network device 200, refer to the foregoing method embodiments. Details are not described herein again.

An embodiment of this application provides a communication apparatus, including a processor and a memory. The memory is configured to store a program, and the processor invokes the program stored in the memory, so that the communication apparatus performs the communication methods of the network device in FIG. 6, FIG. 15, and FIG. 17.

An embodiment of this application provides a computer-readable storage medium. The computer-readable storage medium stores instructions. When the instructions are run on a computer or a processor, the computer or the processor is enabled to perform the communication methods of the terminal device or the network device in FIG. 6, FIG. 15, and FIG. 17.

An embodiment of this application provides a computer program product including instructions. When the instructions are run on a computer or a processor, the computer or the processor is enabled to perform the communication methods of the terminal device or the network device in FIG. 6, FIG. 15, and FIG. 17.

An embodiment of this application provides a chip system. The chip system includes a processor, used by a communication apparatus to perform the communication methods of the terminal device in FIG. 6, FIG. 15, and FIG. 17. For example, a first terminal device determines a reference time domain position based on a preconfigured uplink time-frequency resource, where the reference time domain position is the same as a reference time domain position determined by another terminal device in a plurality of terminal devices, and the reference time domain position is used to initialize a first sequence; the first terminal device generates a first reference signal based on the first sequence and a time interval, where the time interval is an interval between the reference time domain position and a start time domain position of transmission of the first reference signal; the first terminal device sends the first reference signal to a network device.

In some embodiments, the chip system includes a memory. The memory is configured to store a program instruction and data that are necessary for the terminal device. The chip system may include a chip and an integrated circuit, or may include a chip and another discrete device. This is not specifically limited in this embodiment of this application.

An embodiment of this application provides a chip system. The chip system includes a processor, used by a communication apparatus to perform the communication methods of the network device in FIG. 6, FIG. 15, and FIG. 17. For example, a network device determines a reference time domain position based on a preconfigured uplink time-frequency resource, where the reference time domain position is the same as a reference time domain position determined by another terminal device in a plurality of terminal devices, and the reference time domain position is used to initialize a first sequence; the network device generates a first reference signal based on the first sequence and a time interval, where the time interval is an interval between the reference time domain position and a start time domain position of transmission of the first reference signal; the network device receives a second reference signal from a first terminal device; and the network device demodulates uplink data from the first terminal device based on the first reference signal and the second reference signal.

In some embodiments, the chip system includes a memory. The memory is configured to store a program instruction and data that are necessary for the network device. The chip system may include a chip and an integrated circuit, or may include a chip and another discrete device. This is not specifically limited in this embodiment of this application.

The communication apparatuses, the computer storage medium, the computer program product, or the chip systems provided in this application are configured to perform the foregoing communication methods. Therefore, for beneficial effects that can be achieved, refer to the beneficial effects in the implementations provided above. Details are not described herein again.

It should be understood that, sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm operations can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that, the disclosed system, device, and method may be implemented in other manners. For example, the described device embodiments are merely an example. For example, the division into units is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electrical, mechanical, or another form.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedures or the functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method is applicable to a wireless communication system, the wireless communication system comprises a first cell, the first cell comprises a plurality of terminal devices that can transmit uplink data on a same uplink time-frequency resource, the plurality of terminal devices comprise a first terminal device, and the method comprises:
  determining, by the first terminal device, a reference time domain position based on a preconfigured uplink time-frequency resource, wherein the reference time domain position is the same as a reference time domain position determined by another terminal device in the plurality of terminal devices, and the reference time domain position is used to initialize a first sequence;

generating, by the first terminal device, a first reference signal based on the first sequence and a time interval; and sending, by the first terminal device, the first reference signal to a network device.

2. The method according to claim 1, wherein the time interval is an interval between the reference time domain position and a start time domain position of transmission of the first reference signal, and the reference time domain position is a time domain position before a start time domain position of the preconfigured uplink time-frequency resource in a periodicity of the preconfigured uplink time-frequency resource.

3. The method according to claim 2, wherein the reference time domain position is a start position of the periodicity of the preconfigured uplink time-frequency resource.

4. The method according to claim 3, wherein the start position of the periodicity of the preconfigured uplink time-frequency resource satisfies:

(Subframe number corresponding to the start position) mod (Periodicity of the preconfigured uplink time-frequency resource/First specified value)=0; or (Frame number corresponding to the start position) mod (Periodicity of the preconfigured uplink time-frequency resource/Second specified value)=0, wherein mod( ) represents modulo, and the first specified value or the second specified value is a positive number.

5. The method according to claim 1, wherein the reference time domain position is a start time domain position of the preconfigured uplink time-frequency resource.

6. The method according to claim 1, wherein the determining, by the first terminal device, a reference time domain position based on a preconfigured uplink time-frequency resource comprises:

receiving, by the first terminal device, first indication information from the network device, wherein the first indication information is used to indicate first offset duration of the reference time domain position relative to a start position of a periodicity of the preconfigured uplink time-frequency resource; and determining, by the first terminal device, the reference time domain position based on the first indication information and the start position of the periodicity of the preconfigured uplink time-frequency resource.

7. The method according to claim 1, wherein the determining, by the first terminal device, a reference time domain position based on a preconfigured uplink time-frequency resource comprises:

receiving, by the first terminal device, second indication information from the network device, wherein the second indication information is used to indicate second offset duration of a start time domain position of the preconfigured uplink time-frequency resource relative to the reference time domain position; and determining, by the first terminal device, the reference time domain position based on the second indication information and the start time domain position of the preconfigured uplink time-frequency resource.

8. The method according to claim 1, wherein the generating, by the first terminal device, a first reference signal based on the first sequence and a time interval comprises:

generating, by the first terminal device based on the first sequence and the time interval, the first reference signal whose length is transmission duration of the first reference signal.

9. A communication method, wherein the method is applicable to a wireless communication system, the wireless communication system comprises a first cell, the first cell comprises a plurality of terminal devices that can transmit uplink data on a same uplink time-frequency resource, the plurality of terminal devices comprise a first terminal device, and the method comprises:

determining, by a network device, a reference time domain position based on a preconfigured uplink time-frequency resource, wherein the reference time domain position is the same as a reference time domain position determined by another terminal device in the plurality of terminal devices, and the reference time domain position is used to initialize a first sequence;

generating, by the network device, a first reference signal based on the first sequence and a time interval;

receiving, by the network device, a second reference signal from the first terminal device; and demodulating, by the network device, uplink data from the first terminal device based on the first reference signal and the second reference signal.

10. The method according to claim 9, wherein the time interval is an interval between the reference time domain position and a start time domain position of transmission of the first reference signal, and the reference time domain position is a time domain position before a start time domain position of the preconfigured uplink time-frequency resource in a periodicity of the preconfigured uplink time-frequency resource.

11. The method according to claim 10, wherein the reference time domain position is a start position of the periodicity of the preconfigured uplink time-frequency resource.

12. The method according to claim 11, wherein the start position of the periodicity of the preconfigured uplink time-frequency resource satisfies:

(Subframe number corresponding to the start position) mod (Periodicity of the preconfigured uplink time-frequency resource/First specified value)=0; or (Frame number corresponding to the start position) mod (Periodicity of the preconfigured uplink time-frequency resource/Second specified value)=0, wherein mod( ) represents modulo, and the first specified value or the second specified value is a positive number.

13. A first terminal device, wherein the first terminal device is applicable to a wireless communication system, the wireless communication system comprises a first cell, the first cell comprises a plurality of terminal devices that can transmit uplink data on a same uplink time-frequency resource, and the plurality of terminal devices comprise the first terminal device, wherein the first terminal device comprises a transceiver module and a processing module, wherein the processing module is configured to determine a reference time domain position based on a preconfigured uplink time-frequency resource, wherein the reference time domain position is the same as a reference time domain position determined by another terminal device in the plurality of terminal devices, and the reference time domain position is used to initialize a first sequence;

the processing module is configured to generate a first reference signal based on the first sequence and a time interval; and the transceiver module is configured to send the first reference signal to a network device.

14. The first terminal device according to claim 13, wherein
the time interval is an interval between the reference time domain position and a start time domain position of transmission of the first reference signal, and
the reference time domain position is a time domain position before a start time domain position of the preconfigured uplink time-frequency resource in a periodicity of the preconfigured uplink time-frequency resource.

15. The first terminal device according to claim 14, wherein the reference time domain position is a start position of the periodicity of the preconfigured uplink time-frequency resource.

16. The first terminal device according to claim 15, wherein the start position of the periodicity of the preconfigured uplink time-frequency resource satisfies:
(Subframe number corresponding to the start position) mod (Periodicity of the preconfigured uplink time-frequency resource/First specified value)=0; or
(Frame number corresponding to the start position) mod (Periodicity of the preconfigured uplink time-frequency resource/Second specified value)=0, wherein mod( ) represents modulo, and the first specified value or the second specified value is a positive number.

17. The first terminal device according to claim 13, wherein the reference time domain position is a start time domain position of the preconfigured uplink time-frequency resource.

18. The first terminal device according to claim 13, wherein that the processing module is configured to determine a reference time domain position based on a preconfigured uplink time-frequency resource comprises:
the transceiver module is configured to receive first indication information from the network device, wherein the first indication information is used to indicate first offset duration of the reference time domain position relative to a start position of a periodicity of the preconfigured uplink time-frequency resource; and
the processing module is configured to determine the reference time domain position based on the first indication information and the start position of the periodicity of the preconfigured uplink time-frequency resource.

19. The first terminal device according to claim 13, wherein that the processing module is configured to determine a reference time domain position based on a preconfigured uplink time-frequency resource comprises:
the transceiver module is configured to receive second indication information from the network device, wherein the second indication information is used to indicate second offset duration of a start time domain position of the preconfigured uplink time-frequency resource relative to the reference time domain position; and
the processing module is configured to determine the reference time domain position based on the second indication information and the start time domain position of the preconfigured uplink time-frequency resource.

20. The first terminal device according to claim 13, wherein that the processing module is configured to generate a first reference signal based on the first sequence and a time interval comprises:
the processing module is configured to generate, based on the first sequence and the time interval, the first reference signal whose length is transmission duration of the first reference signal.

* * * * *